United States Patent
Valli et al.

(10) Patent No.: US 11,893,755 B2
(45) Date of Patent: Feb. 6, 2024

(54) MULTI-FOCAL PLANES WITH VARYING POSITIONS

(71) Applicant: InterDigital VC Holdings, Inc., Wilmington, DE (US)

(72) Inventors: Seppo T. Valli, Espoo (FI); Pekka K. Siltanen, Helsinki (FI)

(73) Assignee: InterDigital VC Holdings, Inc., Wilmington, DE (US)

( * ) Notice: Subject to any disclaimer, the term of this patent is extended or adjusted under 35 U.S.C. 154(b) by 753 days.

(21) Appl. No.: 16/963,162

(22) PCT Filed: Jan. 16, 2019

(86) PCT No.: PCT/US2019/013803
§ 371 (c)(1),
(2) Date: Jul. 17, 2020

(87) PCT Pub. No.: WO2019/143688
PCT Pub. Date: Jul. 25, 2019

(65) Prior Publication Data
US 2021/0133994 A1    May 6, 2021

Related U.S. Application Data

(60) Provisional application No. 62/619,401, filed on Jan. 19, 2018.

(51) Int. Cl.
*G06T 7/536* (2017.01)
*G06T 7/55* (2017.01)
(Continued)

(52) U.S. Cl.
CPC .......... *G06T 7/536* (2017.01); *G02B 27/0101* (2013.01); *G06T 7/55* (2017.01); *G06T 7/97* (2017.01); *G06T 19/006* (2013.01)

(58) Field of Classification Search
CPC .. G06T 7/536; G06T 7/55; G06T 7/97; G06T 19/006; G02B 27/0101; G02B 2027/0185;
(Continued)

(56) References Cited

U.S. PATENT DOCUMENTS

| 5,793,985 A | 8/1998 | Natarajan |
| 7,116,324 B2 | 10/2006 | Kaye |

(Continued)

FOREIGN PATENT DOCUMENTS

| CA | 2950429 A1 | 12/2015 |
| CN | 102611909 A | 7/2012 |

(Continued)

OTHER PUBLICATIONS

International Search Report and Written Opinion of the International Searching Authority for PCT/US2019/039746 dated Oct. 9, 2019, 11 pages.

(Continued)

*Primary Examiner* — Solomon G Bezuayehu
(74) *Attorney, Agent, or Firm* — Klintworth & Rozenblat IP LLP

(57) ABSTRACT

Systems and methods are described for display of a depth image (depth plus texture) using multiple focal planes. In one embodiment, a depth image (which may be a frame of a depth video, consisting of a video plus depth sequence) is mapped to a first set of image planes. The depth image (or a subsequent frame of the depth video) is mapped to a second set of image planes. Each image plane in the first and second set has a specified depth, and the first and second set differ in at least one depth. Each of the image planes is displayed in the first set at the respective depth of that image plane, and, subsequently, each of the image planes in the second set is displayed at its respective depth. Display of the first and second sets may be cyclically alternated at rate sufficiently high to avoid perceptible flicker.

19 Claims, 20 Drawing Sheets

(51) Int. Cl.
  *G06T 7/00* (2017.01)
  *G02B 27/01* (2006.01)
  *G06T 19/00* (2011.01)
(58) Field of Classification Search
  CPC .... G02B 27/017; G02B 27/01; H04N 13/344;
                                          H04N 13/395
  See application file for complete search history.

(56) References Cited

U.S. PATENT DOCUMENTS

| | | |
|---|---|---|
| 8,120,547 B2 | 2/2012 | Seymour |
| 8,432,434 B2 | 4/2013 | Veeraraghavan |
| 8,576,276 B2 | 11/2013 | Bar-Zeev |
| 8,717,423 B2 | 5/2014 | Vesely |
| 8,730,354 B2 | 5/2014 | Stafford |
| 9,030,749 B2 | 5/2015 | Lescure |
| 9,035,943 B1 | 5/2015 | Han |
| 9,077,986 B2 | 7/2015 | Singh |
| 9,213,405 B2 | 12/2015 | Perez |
| 9,223,138 B2 | 12/2015 | Bohn |
| 9,362,994 B2 | 6/2016 | Seol |
| 9,407,904 B2 | 8/2016 | Sandrew |
| 9,437,038 B1 | 9/2016 | Costello |
| 9,547,174 B2 | 1/2017 | Gao |
| 9,667,327 B2 | 5/2017 | Lee |
| 9,804,395 B2 | 10/2017 | Wu |
| 10,901,291 B1* | 1/2021 | Sulai .................. H04N 13/383 |
| 2005/0190180 A1 | 9/2005 | Jin |
| 2006/0088211 A1 | 4/2006 | Kusakabe |
| 2007/0183675 A1 | 8/2007 | Morohashi |
| 2008/0123738 A1 | 5/2008 | Katsavounidis |
| 2008/0252556 A1 | 10/2008 | Tseng |
| 2009/0003714 A1 | 1/2009 | Subramaniam |
| 2009/0034616 A1 | 2/2009 | Abe |
| 2009/0125291 A1 | 5/2009 | Mohandas |
| 2009/0245688 A1 | 10/2009 | Robinson |
| 2010/0034480 A1 | 2/2010 | Rao |
| 2010/0128145 A1 | 5/2010 | Pitts |
| 2010/0238366 A1 | 9/2010 | Chang |
| 2011/0075257 A1 | 3/2011 | Hua |
| 2011/0273466 A1 | 11/2011 | Imai |
| 2012/0127062 A1 | 5/2012 | Bar-Zeev |
| 2012/0127284 A1 | 5/2012 | Bar-Zeev |
| 2012/0128244 A1 | 5/2012 | Singh |
| 2012/0200676 A1 | 8/2012 | Huitema |
| 2012/0307108 A1 | 12/2012 | Forutanpour |
| 2013/0050432 A1 | 2/2013 | Perez |
| 2013/0113984 A1 | 5/2013 | Shimamoto |
| 2013/0183021 A1 | 7/2013 | Osman |
| 2014/0118509 A1 | 5/2014 | Kroon |
| 2014/0132724 A1* | 5/2014 | Choi ..................... G02B 30/52 |
| | | 359/290 |
| 2014/0192281 A1 | 7/2014 | Smithwick |
| 2014/0267852 A1 | 9/2014 | Bluzer |
| 2014/0292812 A1 | 10/2014 | Fink |
| 2014/0307952 A1* | 10/2014 | Sweeney ............... G06V 10/811 |
| | | 382/154 |
| 2014/0355707 A1 | 12/2014 | Kim |
| 2015/0062370 A1 | 3/2015 | Shroff |
| 2015/0098126 A1* | 4/2015 | Keller .................. G02B 21/367 |
| | | 359/385 |
| 2015/0145977 A1 | 5/2015 | Hoffman |
| 2015/0153559 A1 | 6/2015 | Sato |
| 2015/0222884 A1* | 8/2015 | Cheng .................. H04N 13/395 |
| | | 348/55 |
| 2015/0235467 A1 | 8/2015 | Schowengerdt |
| 2015/0243102 A1 | 8/2015 | Schowengerdt |
| 2015/0277121 A1 | 10/2015 | Fridental |
| 2015/0331237 A1 | 11/2015 | Itani |
| 2015/0341093 A1 | 11/2015 | Ji |
| 2015/0346495 A1* | 12/2015 | Welch .................. G02B 27/017 |
| | | 345/8 |
| 2016/0014350 A1 | 1/2016 | Osman |
| 2016/0080717 A1 | 3/2016 | Reiss |
| 2016/0148416 A1 | 5/2016 | Wu |
| 2016/0191893 A1 | 6/2016 | Gewickey |
| 2016/0277725 A1 | 9/2016 | Ellsworth |
| 2016/0307368 A1 | 10/2016 | Akeley |
| 2017/0039686 A1 | 2/2017 | Miura |
| 2017/0054967 A1 | 2/2017 | Zhang |
| 2017/0085863 A1 | 3/2017 | Lopez |
| 2017/0102545 A1 | 4/2017 | Hua |
| 2017/0127046 A1 | 5/2017 | Das |
| 2017/0181132 A1 | 6/2017 | Xiao |
| 2017/0301313 A1 | 10/2017 | Perreault |
| 2017/0323485 A1* | 11/2017 | Samec ............... A61B 5/14532 |
| 2018/0039084 A1 | 2/2018 | Schowengerdt |
| 2018/0048882 A1 | 2/2018 | Eash |
| 2018/0075659 A1 | 3/2018 | Browy |
| 2018/0095284 A1 | 4/2018 | Welch |
| 2018/0098051 A1 | 4/2018 | Emberger |
| 2018/0114328 A1 | 4/2018 | Jin |
| 2018/0115700 A1 | 4/2018 | Ryan |
| 2018/0259743 A1 | 9/2018 | Sasaki |
| 2019/0187474 A1* | 6/2019 | Bhargava ........... G02B 27/0944 |
| 2019/0339526 A1 | 11/2019 | Welch |
| 2020/0007760 A1 | 1/2020 | Yokokawa |

FOREIGN PATENT DOCUMENTS

| | | |
|---|---|---|
| CN | 103076156 A | 5/2013 |
| CN | 103634588 A | 3/2014 |
| CN | 104639930 A | 5/2015 |
| CN | 104899870 A | 9/2015 |
| CN | 105474622 A | 4/2016 |
| CN | 106125246 A | 11/2016 |
| CN | 106233189 A | 12/2016 |
| CN | 106537219 A | 3/2017 |
| CN | 106875436 A | 6/2017 |
| CN | 107203045 A | 9/2017 |
| CN | 107272199 A | 10/2017 |
| CN | 107924104 A | 4/2018 |
| EP | 3149939 A1 | 4/2017 |
| JP | 2000156876 | 6/2000 |
| JP | 2010217859 | 9/2010 |
| JP | 2017529635 | 10/2017 |
| JP | 2017229037 | 12/2017 |
| WO | 0135154 | 5/2001 |
| WO | 0135154 A1 | 5/2001 |
| WO | 2008038205 A2 | 4/2008 |
| WO | 2009155688 A1 | 12/2009 |
| WO | 2012175939 | 12/2012 |
| WO | 2012175939 A1 | 12/2012 |
| WO | 2014119555 | 8/2014 |
| WO | 2015192117 A1 | 12/2015 |
| WO | 2016138313 A1 | 9/2016 |
| WO | 2017055894 A1 | 4/2017 |

OTHER PUBLICATIONS

Chang, Jen-Hao, et. al., "Towards Multifocal Displays with Dense Focal Stacks". arxiv.org, Cornell University Library, ACM Transactions on Graphics, vol. 37, No. 6, Art. 198, Nov. 2018, pp. 198:1-198:17.

Akeley, K. et al., "A Stereo Display Prototype with Multiple Focal Distances", ACM Transactions on Graphics (TOG), vol. 23 No. 3, Aug. 2004, pp. 804-813 (10 pages).

J. P. Rolland, M. Krueger, and A. Goon (2000), "Multifocal planes head-mounted displays," Appl. Opt. 39, 3209-3215, 2000, pp. 3209-3215.

Liu, S. et al., "A systematic method for designing depth-fused multi-focal plane three-dimensional displays", Optics Express 11562, vol. 18, No. 11, 2010 (12 pages).

Watt, S. J., et al., "Real-world stereoscopic performance in multiple-focal-plane displays: How far apart should the image planes be ?. " Stereoscopic Displays and Applications XXIII, vol. 8288, p. 82881E. International Society for Optics and Photonics, 2012 (11 pages).

Johnson, P. V. et al., "Dynamic lens and monovision 3D displays to improve viewer comfort", Optics express, vol. 24 No. 11, 2016 pp. 11808-11827 (20 pages).

(56) References Cited

OTHER PUBLICATIONS

Narain, R. et al., "Optimal presentation of imagery with focus cues on multi-plane displays." ACM Transactions on Graphics (TOG) vol. 34, No. 4 Article 59, Aug. 2015 (12 pages).
W. Wu et. al., "Content-adaptive focus configuration for near-eye multi-focal displays", Proc. IEEE Int. Conf. Multimedia Expo (ICME), Jul. 2016 (6 pages).
Liu, S. et al., "A Novel Prototype for an Optical See-Through Head-Mounted Display with Addressable Focus Cues", IEEE Transactions on Visualization and Computer Graphics, vol. 16, No. 3, May/Jun. 2010, pp. 381-393 (14 pages).
Cheng, D. et al., "Design of an optical see-through head-mounted display with a low f-number and large field of view using a freeform prism." Applied optics vol. 48 No. 14 May 2009 pp. 2655-2668 (14 pages).
Xinda Hu (2014), "Development of the Depth-Fused Multi-Focal-Plane Display Technology", PhD Thesis, University of Arizona, 2014, (130 pages).
Hu, X. et al., "Design and assessment of a depth-fused multi-focal-plane display prototype" Journal of Display Technology. vol. 10 No. 4, pp. 308-316 (9 pages).
Mackenzie, K. et al., "Accommodation to multiple-focal-plane displays: Implications for improving stereoscopic displays and for accommodation control." Journal of vision 10, No. 8, 2010 (20 pages).
Brunet, F. "Contributions to parametric image registration and 3d surface reconstruction." European Ph. D. in Computer Vision, Université dAuvergne, Clérmont-Ferrand, France, and Technische Universitat Munchen, Germany, Nov. 2010 (234 pages).
Hu, X et. al., "High-resolution optical see-through multi-focal-plane head-mounted display using freeform optics" Optics Express 13896, vol. 22, No. 11, May 2014 (8 pages).
Sheng Liu, et. al., "Time-multiplexed dual-focal plane head-mounted display with a liquid lens", Optics Letters vol. 34, No. 11, Jun. 1, 2009, published on May 21, 2009.
Sheng Liu, et. al. "An Optical See-Through Head Mounted Display with Addressable Focal Planes", IEEE International Symposium on Mixed and Augmented Reality Sep. 15-18, 2008, pp. 33-42 (10 pages).
International Search Report and Written Opinion of the International Searching Authority for PCT/US2019/013803 dated Apr. 18, 2019, (11 pages).
International Preliminary Report on Patentability for PCT/US2019/013803 dated May 7, 2020, (11 pages).
International Search Report and Written Opinion of the International Searching Authority for PCT/US2019/040187 dated Sep. 23, 2019, 12 pages.
International Search Report and Written Opinion of the International Searching Authority for PCT/US2019/023149, dated Jun. 18, 2019, 10 pages.
International Preliminary Report on Patentability for PCT/US2019/039746 dated Jan. 12, 2021, 7 pages.
International Preliminary Report on Patentability PCT/US2019/023149 dated Sep. 29, 2020, 7 pages.
Wikipedia "3D Projection". Wikipedia article modified on Jul. 11, 2017, available at: https://en.wikipedia.org/w/index.php?title=3D_projection&oldid=790065385 (5 pages).
Linwei, Z. et al., "View-spatial-temporal post-refinement for view synthesis in 3D video systems", Signal Processing: Image Communication 28, 2013, pp. 1342-1357 (16 pages).
Kuyuan, X. et al., "Depth map misalignment correction and dilation for DIBR view synthesis", Signal Processing: Image Communication 28, 2013, pp. 1023-1045 (23 pages).
Kristoph F., A 3D-TV Approach Using Depth-Image-Based Rendering (DIBR), Proceedings of VIIP vol. 3 No. 3 Sep. 2003 (6 pages).
Hong, H., "Enabling Focus Cues in Head-Mounted Displays", Proceedings of the IEEE 2017 (18 pages).

Kramida, G. et al., "Resolving the Vergence-Accommodation Conflict in Head-Mounted Displays", IEEE transactions on visualization and computer graphics. 2015 (20 pages).
Suyama, S. et al., "Apparent 3-D image perceived from luminance-modulated two 2-D images displayed at different depths", Vision Research, vol. 44, 2004, pp. 785-793 (9 pages).
Lee, C. et al., "View Synthesis using Depth Map for 3D Video", Asia-Pacific Signal and Information Processing Association, 2009 Annual Summit and Conference, International Organizing Committee, Sapporo, Japan, Oct. 2009, pp. 350-357 (9 pages).
Watt, S. J. et al., "Achieving near-correct focus cues in a 3-D display using multiple image planes", in Human vision and electronic imaging X, vol. 5666, pp. 393-401. International Society for Optics and Photonics, 2005 (9 pages).
Shibata, T. et al., "The zone of comfort: Predicting visual discomfort with stereo displays." Journal of vision 11(8):11, 2011, pp. 1-29 (29 pages).
Huang, F. C. et al., "The Light Field Stereoscope—Immersive Computer Graphics via Factored Near-Eye Light Field Displays with Focus Cues" SIGGRAPH emerging technologies, 2015 (12 pages).
Pan, H. et al., "3D video disparity scaling for preference and prevention of discomfort." Stereoscopic Displays and Applications XXII, vol. 7863, International Society for Optics and Photonics, 2011 (8 pages).
Zannoli, M. et al., "Blur and the perception of depth at occlusions." Journal of Vision 16, No. 6 (2016):17 pp. 1-25 (25 pages).
Hong, H., "Advances in Head-Mounted Light-Field Displays for Virtual and Augmented Reality", Information Display 4/16, SID 2016, pp. 14-21 (8 pages).
Liu, S. et al., "A Novel Prototype for an Optical See-Through Head-Mounted Display with Addressable Focus Cues", IEEE Transactions on Visualization and Computer Graphics, vol. 16, No. 3, May/Jun. 2010, pp. 381-393 (13 pages).
Baker, E. "144Hz Monitor vs 60Hz Monitor—See The Difference" https://www.144hzmonitors.com/other/144hz-monitor-vs-60hz-monitor-see-the-difference (last accessed Nov. 4, 2017).
Lee, Namjeong., et. al., "A New Codebook Structure for Enhanced Multi-User MIMO Transmission in mmWave Hybrid-Beamforming System". IEEE Globecom Workshops (GC Wkshps), (2015), pp. 1-6.
Sukhanov, S. A., "3D content production" St. Petersburg Electrotechnical University, St. Petersburg, Russia, Mar. 12, 2011 https://www.slideshare.net/mikhailvink/sergey-a-sukhanov-3d-content-production last accessed on Feb. 26, 2019 (12 pages).
Lavalle, S. M., et al., "Head tracking for the Oculus Rift." in 2014 IEEE International Conference on Robotics and Automation (ICRA),IEEE, 2014 (8 pages).
"VR AR Judder is Visible Latency" https://medium.com/silicon-valley-global-news/vr-ar-judder-is-visible-latency-2631aa393ebf, Apr. 9, 2016 last accessed Dec. 13, 2021 (6 pages).
Wikipedia, "Multiscopy" last accessed Feb. 1, 2019, available at https://web.archive.org/web/20190201002402/https://en.wikipedia.org/wiki/Multiscopy (3 pages).
Wikipedia, "Light field" last accessed May 29, 2018, available at https://web.archive.org/web/20180529074855/https://en.wikipedia.org/wiki/Light_field (8 pages).
Wikipedia Commons, "File: 2D plus depth.png" last accessed Feb. 22, 2019, available at https://commons.wikimedia.org/w/index.php?curid=5489771 (3 pages).
Shibata,T. et al., "Visual discomfort with stereo displays: effects of viewing distance and direction of vergence-accommodation conflict." in Stereoscopic Displays and Applications XXII, vol. 7863, p. 78630P. International Society for Optics and Photonics, 2011 (9 pages).
Wikipedia, "Photographic Filter" last accessed on May 3, 2019, available at: https://en.wikipedia.org/wiki/Photographic_filter#Diffusion.
Siltanen, Sanni, "Theory and Applications of Marker-Based Augmented Reality". VTT Science 3, Espoo, (2012), (246 pages).
"Oculus Rift Vs. HTC Vive Vs. PlayStation VR" http://www.tomshardware.com/reviews/vive-rift-playstation-vr-comparison,4513-3.html. May 16, 2016 last accessed Dec. 13, 2021 (16 pages).

(56) References Cited

OTHER PUBLICATIONS

"Oculus Rift vs HTC Vive VR headset" http://www.avadirect.com/blog/oculus-rift-vs-htc-vive-vs-rift/ Jan. 26, 2016 last accessed Dec. 13, 2016 (9 pages).
List, U. H. "Nonlinear prediction of head movements for helmet-mounted displays" Air Force Human Resources Lab Brooks AFB TX, 1983 (24 pages).
NVIDIA Announces GamesWorks VR Branding, Adds Mutli-Res Shading, last accessed Dec. 16, 2017, available at https://web.archive.org/web/20171216213416/https://www.anandtech.com/show/9305/nvidia-announces-gameworks-vr-branding-adds-multires-shading , May 31, 2015 (6 pages).
"Samsung Gear VR Headset Lens Review & QR Code" last accessed Nov. 4, 2017, available at https://web.archive.org/web/20171104201025/http://www.sitesinvr.com/viewer/gearvr/index.html (7 pages).
La Rosa, F. et al., "Optical Image Stabilization (OIS)." STMicroelectronics. available online: http://www.st.com/resource/en/white_paper/ois_white_paper.pdf last accessed on Oct. 12, 2017 2015 (26 pages).
Aflaki, M., et al. "Rendering stereoscopic video for simultaneous 2D and 3D presentation," 2013 3DTV Vision Beyond Depth (3DTV-CON), 2013, pp. 1-4. Available online at: https://ieeexplore.ieee.org/document/6676658 (4 pages).
Crayola, "Color Alive" Last accessed May 9, 2019, [http://www.crayola.com/splash/products/ColorAlive].
International Preliminary Report on Patentability for PCT/US2019/040187 dated Jan. 14, 2021 (8 pages).
Wikipedia, "Depth of field" last accessed Mar. 8, 2018, available at https://web.archive.org/web/20180308123938/https://en.wikipedia.org/wiki/Depth_of_field (29 pages).
Honnungar, S. et al., "Focal-sweep for Large Aperture Time-of-Flight Cameras", IEEE International Conference on Image Processing (ICIP), 2016, (5 pages).
Zhuo, S. et al. "Defocus map estimation from a single image", Pattern Recognition 44, Mar. 4, 2011, (19 pages).
Narayanan, P. J., et al., "Depth+ Texture Representation for Image Based Rendering." in Centre for Visual Information Technology, International Institute of Information Technology, 2004 (6 pages).
Pertuz, S.et al., "Generation of all-in-focus images by noise-robust selective fusion of limited depth-of-field images." IEEE Transactions on Image Processing 22, No. 3 (2012, (10 pages).
Billiot, B. et al., "3D image acquisition system based on shape from focus technique." Sensors 13, No. 13, 2013 pp. 5040-5053 (14 pages).
Llull, P., et al. "Design and optimization of a near-eye multifocal display system for augmented reality." Applied Industrial Optics: Spectroscopy, Imaging and Metrology. Optical Society of America, 2015 (3 pages).
Itoh Y., et al., "Occlusion Leak Compensation for Optical See-Through Displays using a Single-layer Transmissive Spatial Light Modulator", IEEE Transactions on Visualization and Computer Graphics, vol. 23, No. 11, Nov. 2017, pp. 2463-2473 (11 pages).
Padmanaban, N., et al., "Optimizing virtual reality for all users through gaze-contingent and adaptive focus displays." Proceedings of the National Academy of Sciences vol. 114 No. 9, Feb. 28, 2017 pp. 2183-2188 (6 pages).
Oskiper, T. et al., "Augmented reality binoculars." IEEE transactions on visualization and computer graphics 21, No. 5, 2015, (10 pages).

Maimone, A. et al., "Computational augmented reality eyeglasses." in 2013 IEEE International Symposium on Mixed and Augmented Reality (ISMAR), IEEE, 2013. (10 pages).
Wilson, A., et al., "Design and prototype of an augmented reality display with per-pixel mutual occlusion capability." Optics express vol. 25, No. 24, Nov. 2017 pp. 30539-30549 (11 pages).
Bos, P. J., et al., "A Simple Method to Reduce Accommodation Fatigue in Virtual Reality and Augmented Reality Displays", SID 2016, (4 pages).
Jamali, A., et al., "Design of a large aperture tunable refractive Fresnel liquid crystal lens", Applied Optics, vol. 57, No. 7, 2018, (10 pages).
Yamaguchi, Y., et al., "See-through integral imaging display with background occlusion capability", Applied Optics vol. 55, No. 3, Jan. 20, 2016, (6 pages).
Kiyokawa, K., et al., "An occlusion-capable optical see-through head mount display for supporting co-located collaboration", ISMAR 2003 (9 pages).
Grubert, J., et al., "A Survey of Calibration Methods for Optical See-Through Head-Mounted Displays", IEEE Transactions on Visualization and Computer Graphics, Early Access Article available in IEEE Xplore, vol. 13 No. 9, 2017 (14 pages).
Itoh, Y., et al., "Semi-parametric color reproduction method for optical see-through head-mounted displays." IEEE transactions on visualization and computer graphics vol. 21, No. 11, Nov. 2015, pp. 1269-1278 (10 pages).
Tatham, E., "Getting the best of both real and virtual worlds," Communications of the ACM, vol. 42 No. 9, 1999, pp. 96-98 (3 pages).
Crecente, B., "Magic Leap: Founder of Secretive Start-Up Unveils Mixed-Reality Goggles" last accessed Mar. 30, 2018, available at https://web.archive.org/web/20180330030004/https://www.rollingstone.com/glixel/features/lightwear- introducing-magic-leaps-mixed-reality-goggles-w514479 (30 pages).
Wang, Y. J., et al., "Augmented reality with image registration, vision correction and sunlight readability via liquid crystal devices." Scientific reports 7, No. 1, 2017, pp. 1-12 (12 pages).
Wang, X., "Different multi-focal-plane method" Dec. 8, 2016, available at https://wp.optics.arizona.edu/optomech/wp-content/uploads/sites/53/2016/12/Tutorial_Wang_Xuan.pdf. (8 pages).
Wagner, D., et al., "Real-Time Detection and Tracking for Augmented Reality on Mobile Phones", IEEE Trans. on Visualization and Computer Graphics, vol. 16, No. 3, May/Jun. 2010, pp. 355-368 (14 pages).
Balram, N., "Fundamentals of light field imaging and display systems." Display Week 2016, (210 pages).
Liu, S., et al., "3-1: A Multi-plane Volumetric Optical See-through Head Mounted 3D Display." in SID Symposium Digest of Technical Papers, vol. 47, No. 1, 2016 (3 pages).
"Rendering" (htips://developer.oculus.com/design/latest/concepts/bp-rendering/ Original date unknown); archived at Wayback Machine (https://web.archive.org/) citing a capture dated Feb. 18, 2018, last visited Apr. 7, 2022 (3 pages).
Ryan, L. "Multiple-focal-planes 3D displays: A practical solution to the vergence-accommodation conflict ?. " In 2012 International Conference on 3D Imaging (IC3D), pp. 1-6. IEEE, 2012 (6 pages).
Wang, Z. "Studies on Integral Imaging 3D Display" A dissertation for doctor's degree, University of Science and Technology of China, May 2017 (115 pages).

* cited by examiner

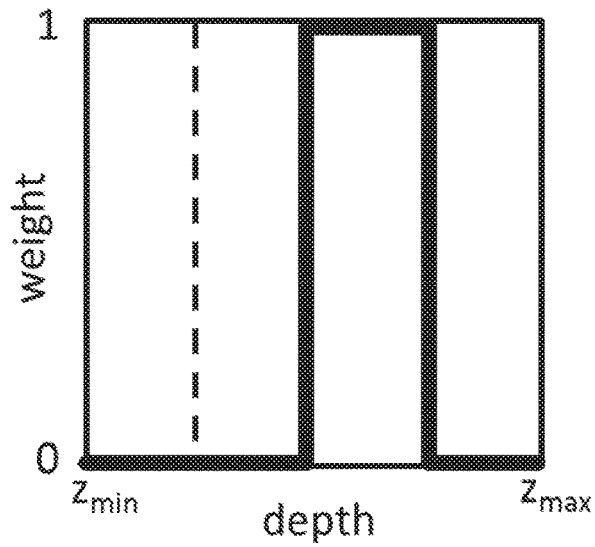
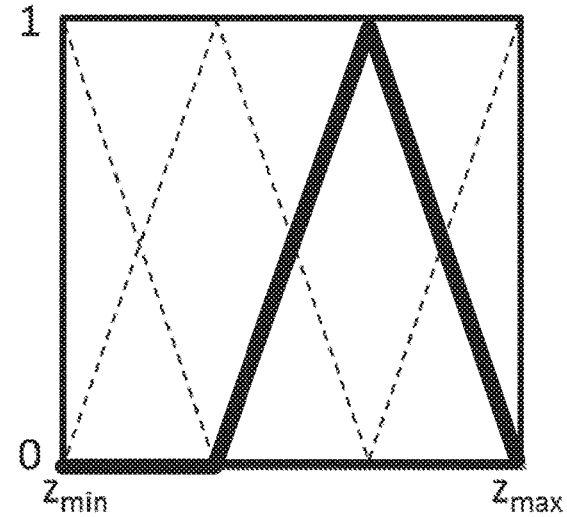
FIG. 4A    FIG. 4B
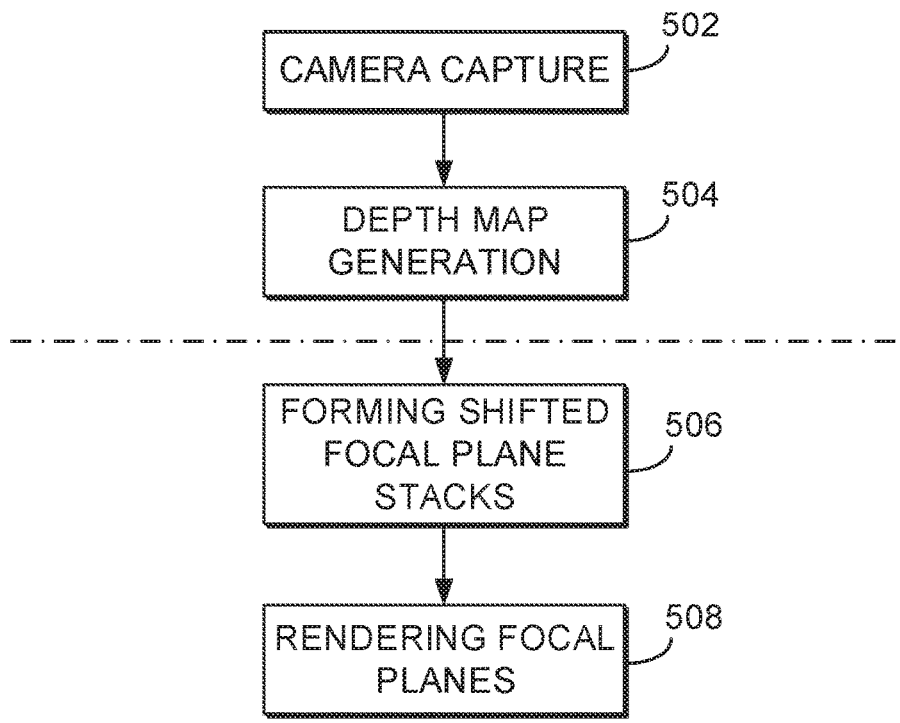
FIG. 5

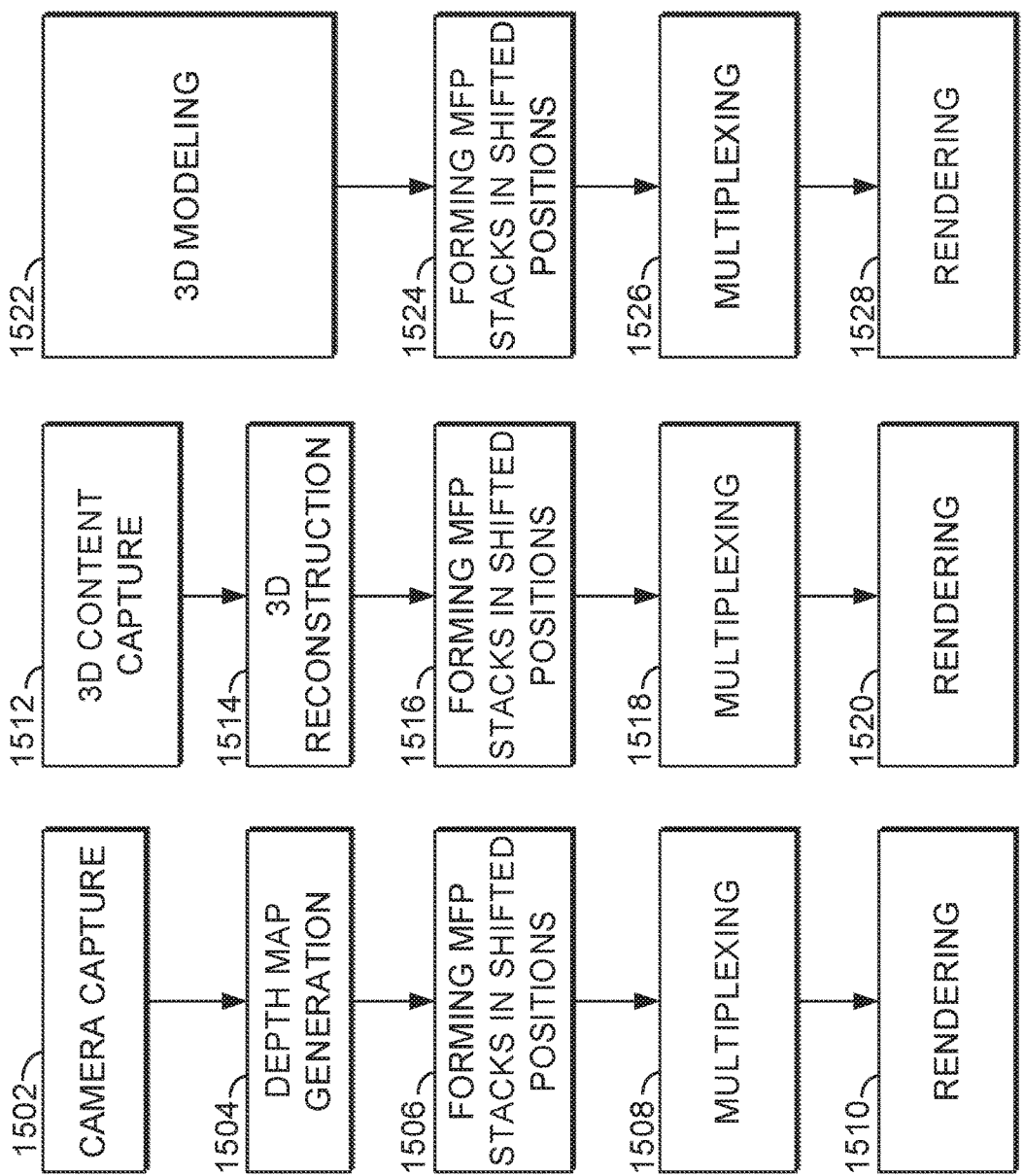

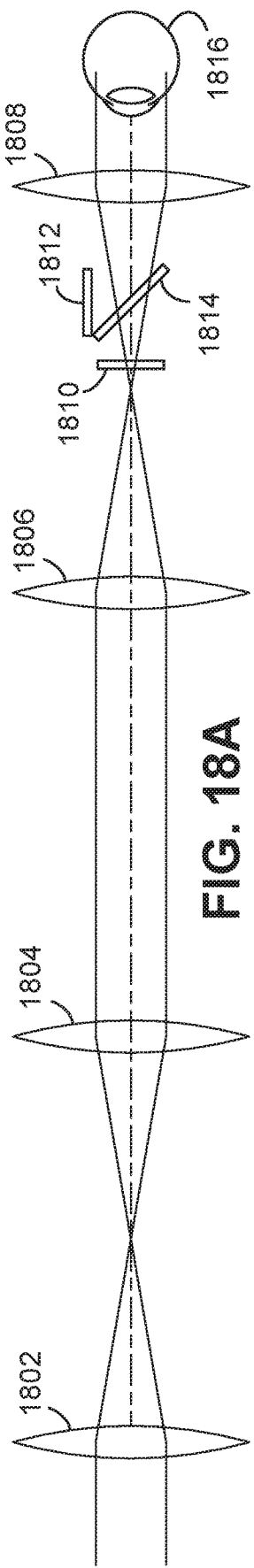
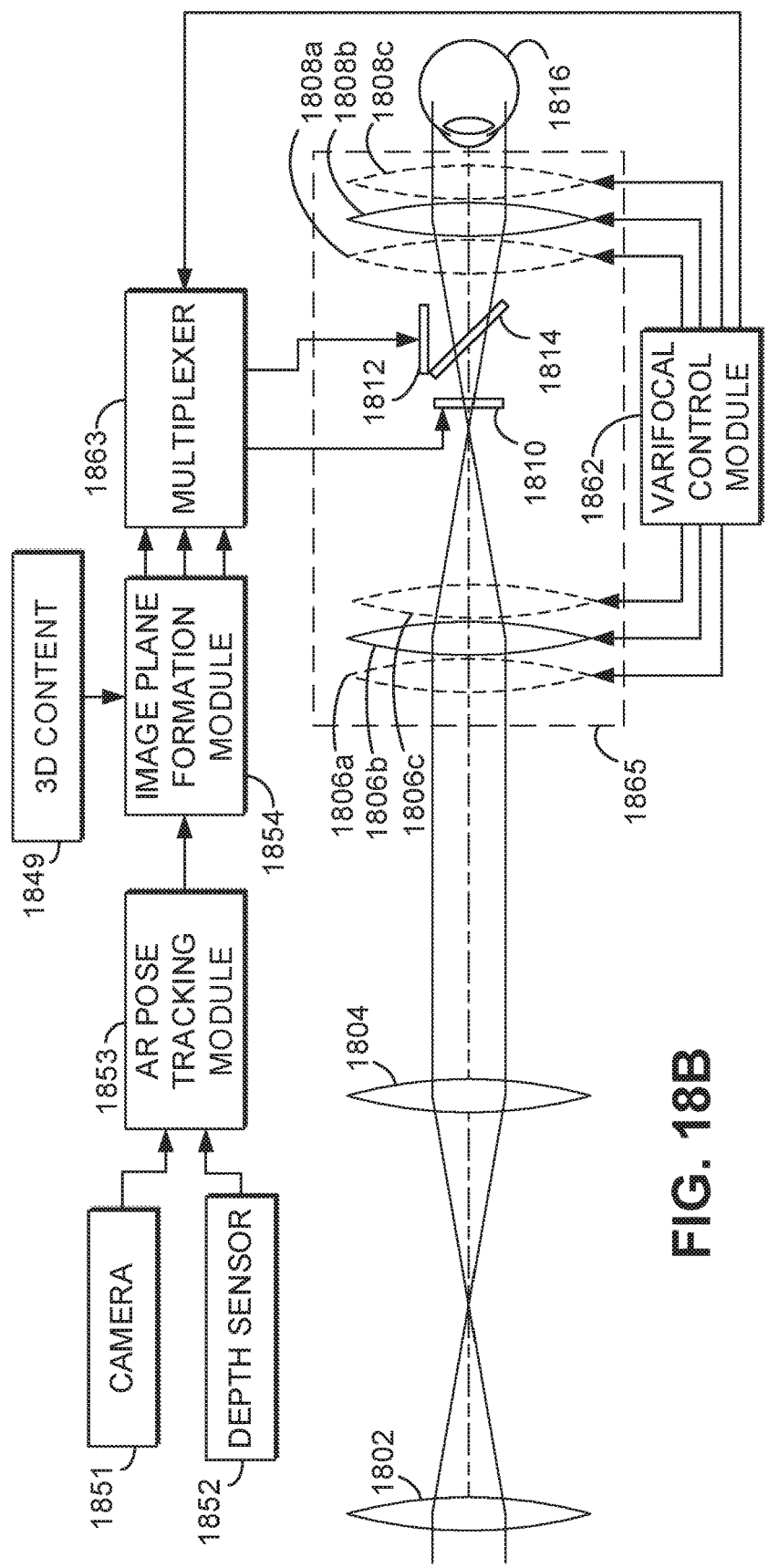

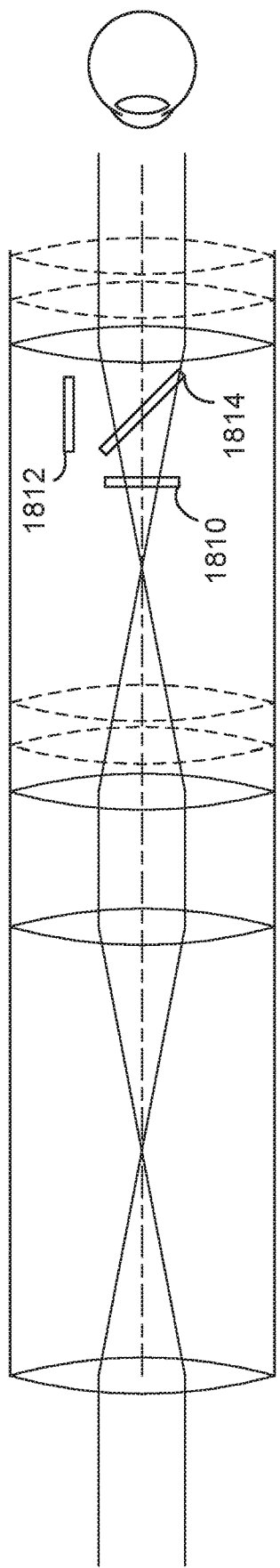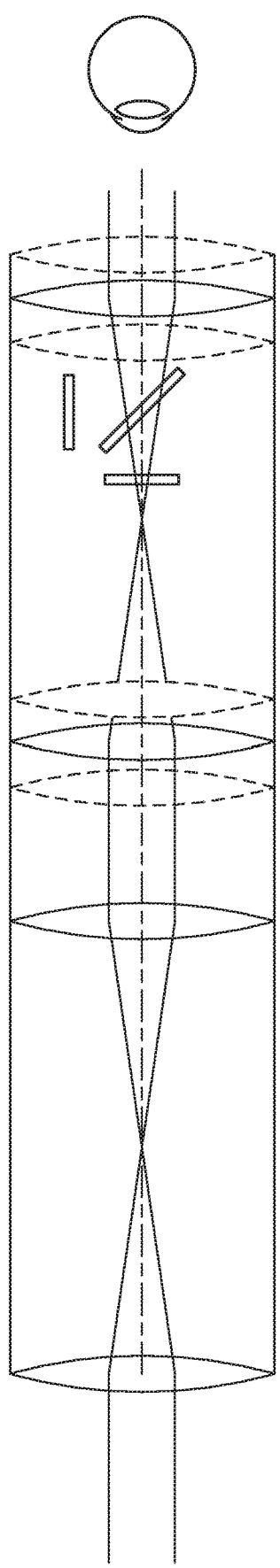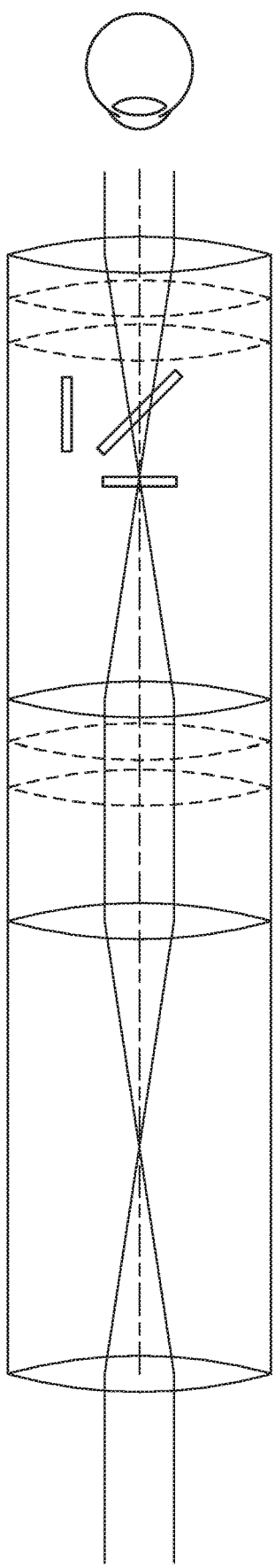

MULTI-FOCAL PLANES WITH VARYING POSITIONS

CROSS-REFERENCE TO RELATED APPLICATIONS

The present application is a national stage application under 35 U.S.C. 371 of International Application No. PCT/US2019/013803, entitled "MULTI-FOCAL PLANES WITH VARYING POSITIONS" filed on Jan. 16, 2019, which claims benefit under 35 U.S.C. § 119(e) from U.S. Provisional Patent Application Ser. No. 62/619,401, filed Jan. 19, 2018, entitled "Multi-Focal Planes with Varying Positions", which is incorporated herein by reference in its entirety.

BACKGROUND

Multifocal plane (MFP) displays create a stack of discrete focal planes, composing a 3D scene from layers along a viewers visual axis. A view to the 3D scene is formed by projecting to the user those pixels from focal planes, which are visible to the users eye-point, at different depths and spatial angles.

Multifocal planes may be implemented by spatially multiplexing a stack of 2D displays or by sequentially switching—in a time-multiplexed way—the focal distance of a single 2D display by a high-speed varifocal element (VFE) while spatially rendering the visible parts of corresponding multifocal image frames. An example of an MFP near-eye display is illustrated in FIG. 2. FIG. 2 illustrates a display viewed by a user's left eye 202 and right eye 204. Respective eyepieces 206, 208 are provided for each eye. The eyepieces focus images formed by respective image stacks 210, 212. The image stacks form different images at different distances from the eyepieces. To the user's eyes, the images appear to originate at different virtual image planes, e.g. image planes 214, 216, 218.

Multi-focal plane (MFP) displays are an attractive way to support natural accommodation in 3D rendered scenes. Due to various technical reasons, near eye displays (NED) are generally able to support only a relatively small number of MFPs, limiting image quality. In many existing approaches, positions of focal planes are fixed, thus creating a permanent average error distribution, favoring information at or near focal planes over information in between them.

The multiple focal planes are primarily complementary, rather than additive, with respect to viewing directions from the eye-point. Additive effects may however smooth out the otherwise visible quantization steps and contouring when seeing views compiled from discrete focal planes.

Note that each image in a stack of (virtual) focal planes is rendered at a different depth, and the eye blurs those focal plane images not being observed. This means that MFP displays do not need simulation of the blur based on eye tracking (for capturing the accommodation depth), which is a considerable benefit of the approach.

Box Filter.

Approximations of focal plane images may be formed by slicing the depth map corresponding each image into narrow depth regions (slices) and projecting the corresponding pixels into a (flat) focal plane in the middle of each depth region.

When viewing a stack of focal planes, the composed view is formed by the information on different focal planes, visible from the viewer's eye-point. Slicing to depth regions results in MFPs completing each other in the spatial (x-y) direction, not adding up along depth dimension (z-dimension).

As a result, a smooth 3D surface is quantized in the depth dimension, as illustrated by FIG. 3.

A box filter separates image information in a strict way in spatial (x-y) and depth (z-) dimensions. As only a discrete number of focal planes is used, the depth dimension is heavily quantized, resulting in low accuracy in presenting a 3D shape.

A larger number of focal planes means better depth accuracy, but it is also more difficult to implement. For technical reasons, the number of focal planes is restricted to only few in practice.

Accuracy of a focal plane is typically best for the pixels at the same depth as the focal plane. Between the focal planes accuracy is lower leading to blurring of displayed image content, even when depth based blending is used to interpolate depth values and reduce depth quantization effects in the rendered view.

Tent Filter.

So called depth-based blending can be used to reduce quantization errors in the depth dimension, which otherwise may be visible to the human eye. Depth blending involves using a depth-based function to weight pixels used to construct each focal plane.

One known depth blending function is the so-called tent filter, which is a piece-wise linear, saw-tooth shaped blending function (FIG. 4B). For a box filter, the corresponding function is shown in FIG. 4A. In addition to above blending filters, other variations have been suggested, including those described in Xinda Hu, "Development of the Depth-Fused Multi-Focal-Plane Display Technology", PhD Thesis, University of Arizona (2014).

Number of Focal Planes.

For any human, at maximum twenty-eight focal panes are believed to be sufficient to cover the depth range from infinity to 4 diopters (25 cm), corresponding to 1/7 diopter spacing for focal planes. For persons with average vision, fourteen focal planes may be sufficient.

For high-quality depth perception, an ideal number of focal planes is thus rather high. On the other hand, displaying a large number of focal planes is limited by various technical reasons. However, intelligent production and positioning of focal planes allows for fewer focal planes to reconstruct a high fidelity view.

When using only a few focal planes, it is beneficial that they be well-positioned considering human eye properties. Because the accuracy of depth perception decreases inversely proportionally to the distance from the viewer, more accuracy is obtained generally by placing the few depth planes as the function of dioptric depth. In addition, the apparent number of focal planes can be increased by depth blending.

The number of focal planes in practical applications is restricted due to various technical reasons. In MFP displays based on stacking physical displays, increasing the number of displays causes problems in transparency (due to display material properties) and increases the thickness of the display structure. In implementations based on time-multiplexing (of either physical or virtual displays), increasing the number of multiplexed displays lowers the brightness of each MFPs (by reducing their on-off ratio), again limiting the maximum number of MFPs.

Regardless of the implementation, the number of focal planes is in practice restricted into relatively few (e.g. 4 to 6). Exemplary embodiments described herein allow for good-quality depth imaging to be accomplished even when a relatively small number of focal planes is available.

SUMMARY

In exemplary embodiments, a multi-focal plane (MFP) display is provided in which the position of the focal planes changes over time. Depth blending functions and focal plane positions are varied in a time dependent, but content independent way. As an example, a class of sinusoidal depth-blending functions may be used, which provides good spatial separation, and supports easy formation of focal planes in varying positions.

Some embodiments provide a method for rendering a video sequence of focal plane images to a multi-focal plane display using time-varying focal plane positions. In one such method, a set of focal planes is selected for display of the video sequence via a multi-focal plane display, where each focal plane of the set of focal planes is associated with a focal distance. The set of focal planes is partitioned into a plurality of subsets, where the subsets are selected individually in a cycle to render successive frames of a video sequence. A time sequence of video frames is rendered with associated depth information using the multi-focal plane display. To render the time sequence of video frames, a method including the following steps may be performed. For each video frame, one of the subsets is selected based on a cyclic ordering of the subsets. A set of blending functions is selected or generated based on the selected subset. A focal plane image is generated for each of the focal planes in the selected subset based on the video frame, the associated depth information of the video frame, and the set of blending functions. The video frame is displayed using the generated focal plane images on the multi-focal plane display. The generated focal plane images may be displayed in a time-multiplexed manner.

In some such embodiments, the displaying of the video frame includes providing the generated focal plane images and associated focal distances to the multi-focal plane display.

In some embodiments, the step of displaying the video frame includes adjusting a variable-focus lens to allow display of each of the generated focal plane images, with the adjustment being based on the focal distance associated with the corresponding focal plane of the selected subset of focal planes.

In some embodiments, a method is provided of displaying an image having corresponding depth information. The image is mapped to a first set of at least two image planes and to a second set of at least two image planes. Each image plane in the first and second set has a specified depth, and the first and second set differ in at least one depth. Each of the image planes in the first set is displayed at the respective depth thereof. After displaying all of the image planes in the first set, each of the image planes in the second set is displayed at the respective depth thereof. In some embodiments, all depths of image planes in the second set are different from all depths of image planes in the first set. The depths of image planes in the second set may be at least partially interleaved with depths of image planes in the first set. In some embodiments, all of the image planes in the first set are displayed simultaneously and, subsequently, all of the image planes in the second set are displayed simultaneously.

In some embodiments, a method is provided of displaying a video comprising a sequence of image frames with corresponding depth information. A first one of the frames to a first set of at least two image planes. A subsequent second one of the frames to a second set of at least two image planes, wherein each image plane in the first and second set has a specified depth, and wherein the first and second set differ in at least one depth. Each of the image planes in the first set is displayed at the respective depth thereof. After displaying all of the image planes in the first set, each of the image planes in the second set is displayed at the respective depth thereof. In some embodiments, odd-numbered frames are mapped to the first set of image planes and even-numbered frames are mapped to the second set of image planes. In some embodiments, all depths of image planes in the second set are different from all depths of image planes in the first set. In some embodiments, depths of image planes in the second set are at least partially interleaved with depths of image planes in the first set.

BRIEF DESCRIPTION OF THE DRAWINGS

FIGS. 4A-4B are schematic illustrations of basic depth blending functions for four MFPs: depth slicing without blending, referred to as a box filter (FIG. 4A), and a linear filter, referred to as a tent filter (FIG. 4B).

FIG. 5 illustrates steps performed in the course of time-multiplexing MPFs in shifted positions.

FIGS. 15A-15C are schematic block diagrams illustrating multiplexing of MPFs in shifted positions.

FIG. 16 is a schematic illustration of an optical structure producing two virtual MFP planes.

FIG. 18A is a schematic cross-sectional view of an optical see-through (OST) display capable of displaying a single focal plane.

FIG. 18B is a schematic cross-sectional view of an optical see-through (OST) display capable of displaying multiple focal planes.

FIGS. 19A-19C are schematic cross-sectional views of an optical see-through display in three different configurations for displaying images at three different focal planes according to some embodiments.

EXAMPLE APPARATUS FOR IMPLEMENTATION OF THE EMBODIMENTS

Figure 1:
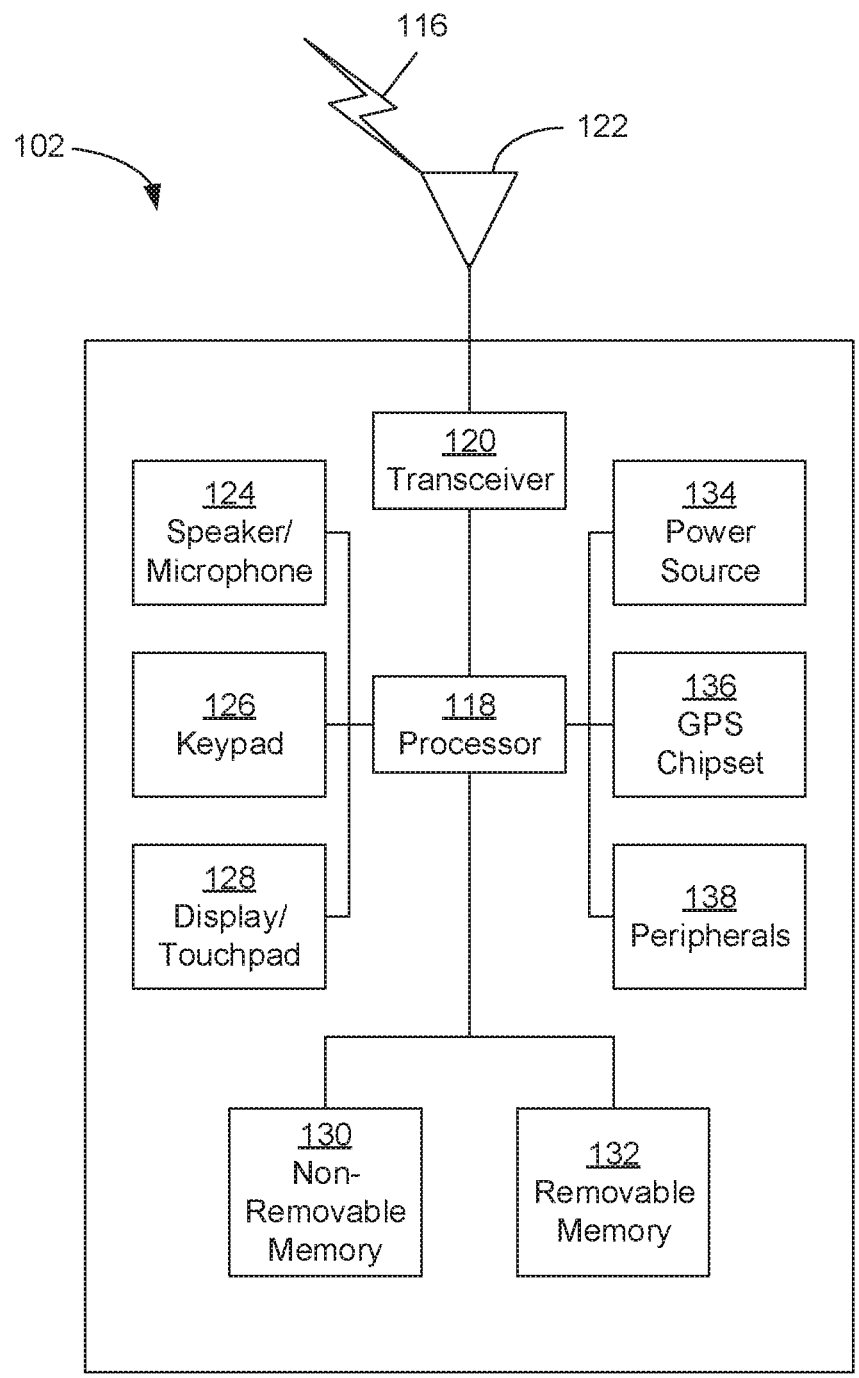
FIG. 1 is a system diagram illustrating an example wireless transmit/receive unit (WTRU) that may be used as a display driver according to an embodiment.

FIG. 1 is a system diagram illustrating an example wireless transmit-receive unit (WTRU) 102 that may be used to drive a display using techniques described herein. As shown in FIG. 1, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1 depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1 as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

DETAILED DESCRIPTION

Parameters that characterize multi focal-plane (MFP) displays generally include the number of focal planes (which may be allocated linearly on dioptric scale) and the properties of depth blending function(s). Both affect the amount and nature of quantization errors in the 3D shape (depth), approximated by the MFPs. In the following, some optimization principles are described.

Optimizing MFPs by Multi-Focal Captures.

In MFP rendering, focal planes may be formed using a texture captured by some chosen aperture and focal length. For example, high spatial frequencies may be suppressed in those unfocused image areas due to blurring induced by the camera optics. Respectively, accuracy may be lacking from the MFPs at corresponding depths/accommodation distances. The texture of the view may be captured with several focal distances.

In Rahul Narain et al., "Optimal Presentation of Imagery with Focus Cues on Multi-Plane Displays", ACM Transactions on Graphics (TOG). vol. 34, no. 4, Article 59, August 2015, an approach is described for forming dioptrically placed MFPs, using multiple scene captures with varying focal length as input. Using multiple focal captures, MFPs can be optimized more accurately according to human visual system (HVS). This applies for example to the effects of refractions, reflections, and other non-Lambertian phenomena in the captured views. In addition to cameras with different focal lengths, a set of input images may be derived from a light field captured from the scene, e.g. with a camera such as the Lytro Ilium.

Optimizing MFPs Based on Displayed Content.

One approach to optimizing MPF rendering is to derive and position focal planes depending on the displayed content using a method such as that of W. Wu et al., "Content-adaptive focus configuration for near-eye multi-focal displays," Proc. IEEE Int. Conf. Multimedia Expo (ICME), July 2016, pp. 1-6. For example, if the pixels of an input image are clustered around certain depth levels or zones, it may be beneficial for the quality to position focal planes around those clusters. When generalized, this approach leads to finding a varying number of irregularly placed focal planes, which optimize the rendering quality according to some content-based criteria.

Problems Addressed in Exemplary Embodiments.

One way to forming multifocal planes is to quantize (discretize) each view in the depth dimension and to map each pixel to its closest focal/depth level. Whether multifocal planes are represented by a stack of physical displays or by rendering them in time-multiplexed way, the result tends to suffer from two noticeable types of distortions, namely flattening (or cardboarding) and contouring (or banding).

These distortions are caused by quantization of depth values, which projects pixels within a depth range onto a plane. The reconstructed view has a stack of flat planes with noticeable depth separation. Many times, objects at different distances are mapped to one of the depth planes and may show up and move like paper cutouts in the reconstructed view.

Contouring and steps are also caused by the abrupt changes of depth when viewing an object crossing adjacent focal planes. These abrupt changes are caused by the non-continuous retinal blur when the gaze is crossing two focal planes. This phenomenon is visible although the viewer may see a correct and undistorted texture.

In existing systems, the number and placement of focal planes is generally fixed and does not change over time. A fixed number and position of focal planes causes a fixed error distribution, which is on average higher between focal planes. This tends to disturb accommodation quality perception between focal planes. Note that depth accuracy affects also to the quality of objects moving in depth, as the amount of blur varies in time for them.

Common optimizing criteria for MFP displays are the number of focal planes (allocated linearly on dioptric scale) and the properties of depth blending function(s) used to reduce quantization effects. Two approaches to MFP optimization include optimization based on multi-focal captures (Narain et al.), and optimization according to rendered content (Wu et al.). These approaches call for either complex scene capture (e.g. for light fields) or complex modelling and calculations of subjective quality (e.g. for perceived spatial frequencies and retinal blur) and MFP placement.

Overview of Exemplary Embodiments.

When using only few focal planes to reconstruct a 3D view, it is beneficial for the focal planes to be positioned as optimally as is reasonable. Basic optimization criteria include for example dioptric spacing of focal planes, following human eye properties, as well as reducing (objective and/or subjective) depth quantization distortions by optimizing depth blending functions.

Exemplary embodiments operate to select—in time dependent way—beneficial depth blending functions and focal plane positions. Exemplary embodiments further provide depth blending functions which provide good spatial separation and support formation of focal planes in varying positions.

Time-Multiplexing MPFs in Shifted Positions.

The accuracy of focal planes is typically best for the pixels at the same depth as the focal plane. Between the focal planes the accuracy is lower, even when depth based blending is used to interpolate pixel values and to reduce depth quantization effects in the rendered view. In many current approaches, the positions of the focal planes are fixed, thus creating a permanent average error distribution, favoring information at or near focal planes over information in between them.

Considering quality perception, it is favorable to let the position of the focal planes change over time, so that the average error distribution is less structured and permanent (and thus varies over time). These changes, referred to herein as multiplexing of focal planes, are preferably performed at high enough rates in order not to cause perceptible flickering artifacts.

One feature of exemplary embodiments the approach is that the display system allows rendering MFPs at varying depths. In addition, forming focal planes is done at varying positions, so that depth blending functions must be shifted along the depth (z) axis.

In exemplary embodiments, sinusoidal blending functions are employed. Such functions are easy to form and their position is easy to vary by changing their phase by a control variable.

When the position is varied between each rendered input image, the chosen positioning is used for all MFPs used for composing the image in question. In this way, the luminance distribution stays substantially unaltered for each rendered MFP stack.

It is worth noticing that the time-varying MFP approach does not necessarily require changes to the refresh rate for time-multiplexing MFPs.

FIG. 5 illustrates steps performed in the time-multiplexing of MPFs in shifted positions. In step 502, an image of a scene is captured, and in step 504, a depth map of the scene is generated. In step 506, shifted stacks of focal planes are formed, and in step 508, the shifted stacks of focal planes are rendered for display. The process of forming shifted MFPs and rendering the focal stack are described in greater detail below.

Potential Benefits of Some Embodiments

A general advantage of an MFP near-eye display is that it supports natural accommodation and vergence. Each image in a stack of focal planes is rendered at a different depth, and the eye makes the blurring for those focal planes not being observed. This enables rendering of focal planes into a volume without the need for tracking a user's eye accommodation. Consequently, an MFP display does not need simulation of retinal blur. Conversely, using eye tracking for blurring tends to be an inaccurate and computationally demanding process.

Quality of an MFP display generally increases by the number of focal planes used for rendering. However, displaying a large number of focal planes is limited due various technical reasons. In practice, the maximum number of focal planes is limited to only few, typically from four to six. High quality rendering would require about doubling the amount.

In some embodiments, a high fidelity view can be reconstructed with a relatively small number of focal planes (e.g. five). This is achieved by interleaving a smaller number of focal planes so that their apparent number is increased. In exemplary embodiments, the rendering quality can be improved with a chosen number of MFPs (chosen complexity), or, by reducing the number of required MFPs, the system complexity can be reduced without lowering the rendering quality.

In embodiments using a stack of physical displays, a reduced number of focal planes leads to better transparency. If the displays—either physical or virtual—are time-multiplexed, fewer displays leads to higher on-off ratio and higher luminance for each focal plane.

A reduced number of focal planes may enable a thinner display structure. This is especially beneficial for optical see-through (OST) displays, which support the option of seeing the real world undistorted through the display structure. Examples of optical see-through displays are described in greater detail below.

Exemplary sinusoidal depth blending functions may have various benefits over the existing ones. The basic way of slicing image information using a box filter produces flattening or cardboarding distortions as well as step or contouring distortions of surfaces extending over several depth slices. A tent filter commonly used to reduce these distortions may also cause discontinuities in luminance distribution, which show up as folds and contours in focal planes.

Sinusoidal blending functions used in some embodiments provide a good spatial separation between focal planes, so that an eye can gaze and accommodate at different depths. Sinusoidal functions are continuous over the whole depth range, and two functions, in closed forms and opposite phases can be used to obtain all weight values required for any set (number of) of blending functions. Closed forms can also be used for forming dioptrically positioned MFPs straight from the linear depth information, such that there is not no need for intermediate mapping between linear and dioptric scales.

Techniques disclosed herein, such as patching or doubling, that operate to increase the apparent number of focal planes, may also be applied to box filters, tent filters, or other known ways of forming focal planes and/or other blending functions.

Some exemplary embodiments are computationally much less demanding than known optimization approaches. Increasing the apparent number of focal planes using techniques such as patching or doubling may give comparable benefits with a more cost efficient system.

In exemplary embodiments, the disclosed system can also be optimized using multiple focal captures (e.g. focus stacks or light fields) or content-based placement of the sets of MFPs.

Exemplary Blending Functions.

In order not to induce luminance changes to the 3D view, the weights for focal plane luminance preferably sum up to value 1. Sinusoidal blending functions ($\sin(x)$ and/or $\cos(x)$) are particularly favorable in this respect. With a proper shift for ordinate values (by 0.5), scale (by 0.5), and phase (by $\pi$), sinusoidal functions sum up to value 1, and can be defined between desired depth ranges.

Figure 6:
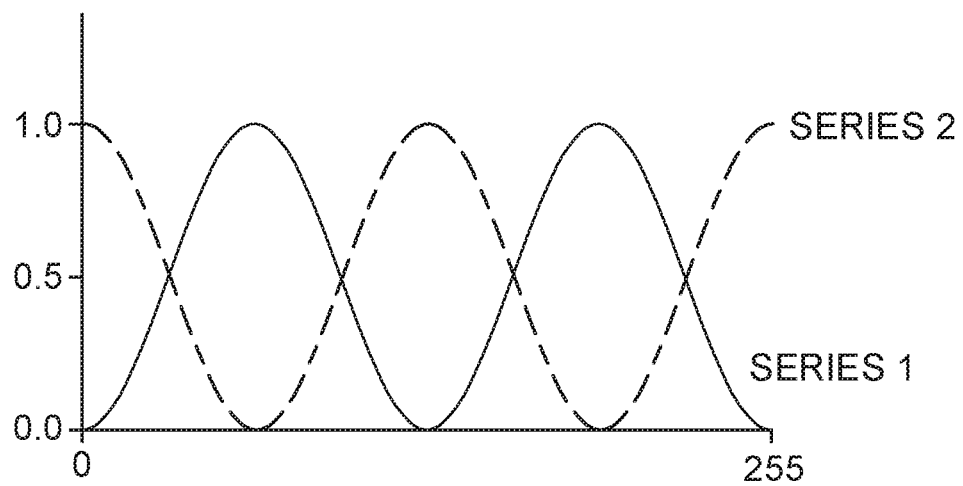
FIG. 6 schematically illustrates an example of two sinusoidal functions producing weights for five focal panes.

FIG. 6 shows an example of two sinusoidal functions, in opposite phases, which can be used to produce blending functions for five focal planes. In the example, a typical depth range from 0 to 255 is used. The solid line ("series 1") may be generated using the expression $$0.5 + 0.5 \cos(4\pi x/255)$$

where x represents the depth. The dashed line ("series 2") may be generated using the expression $$0.5 - 0.5 \cos(4\pi x/255)$$

Such functions generally have the form $0.5 + 0.5 \sin(Ax + B)$ for appropriate values of A and B. Weighting functions for different MFPs may be obtained by selecting appropriate parts of the graphs. In FIG. 6, the horizontal scale is between 0 and 255, which is the range of depth map values used in simulations. Correspondingly, x is function of depth producing the desired number of sinusoidal waves (MFPs) over the used depth scale.

Figure 7:
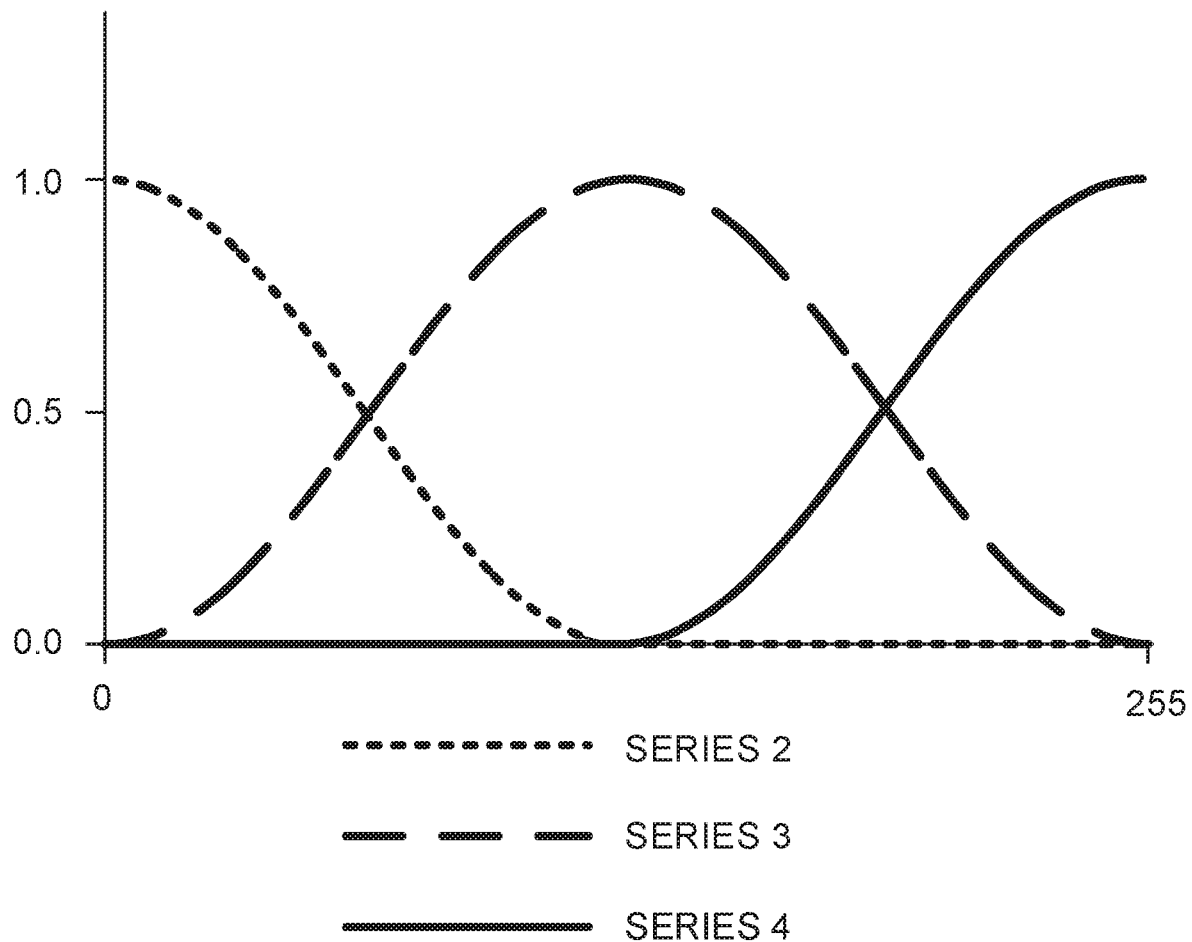
FIG. 7 illustrates two sinusoidal functions split to produce weight for three focal planes (shown by different patterns of lines).

FIG. 7 shows an example of sinusoidal functions split to produce three blending functions for three focal planes, correspondingly.

Figure 8:
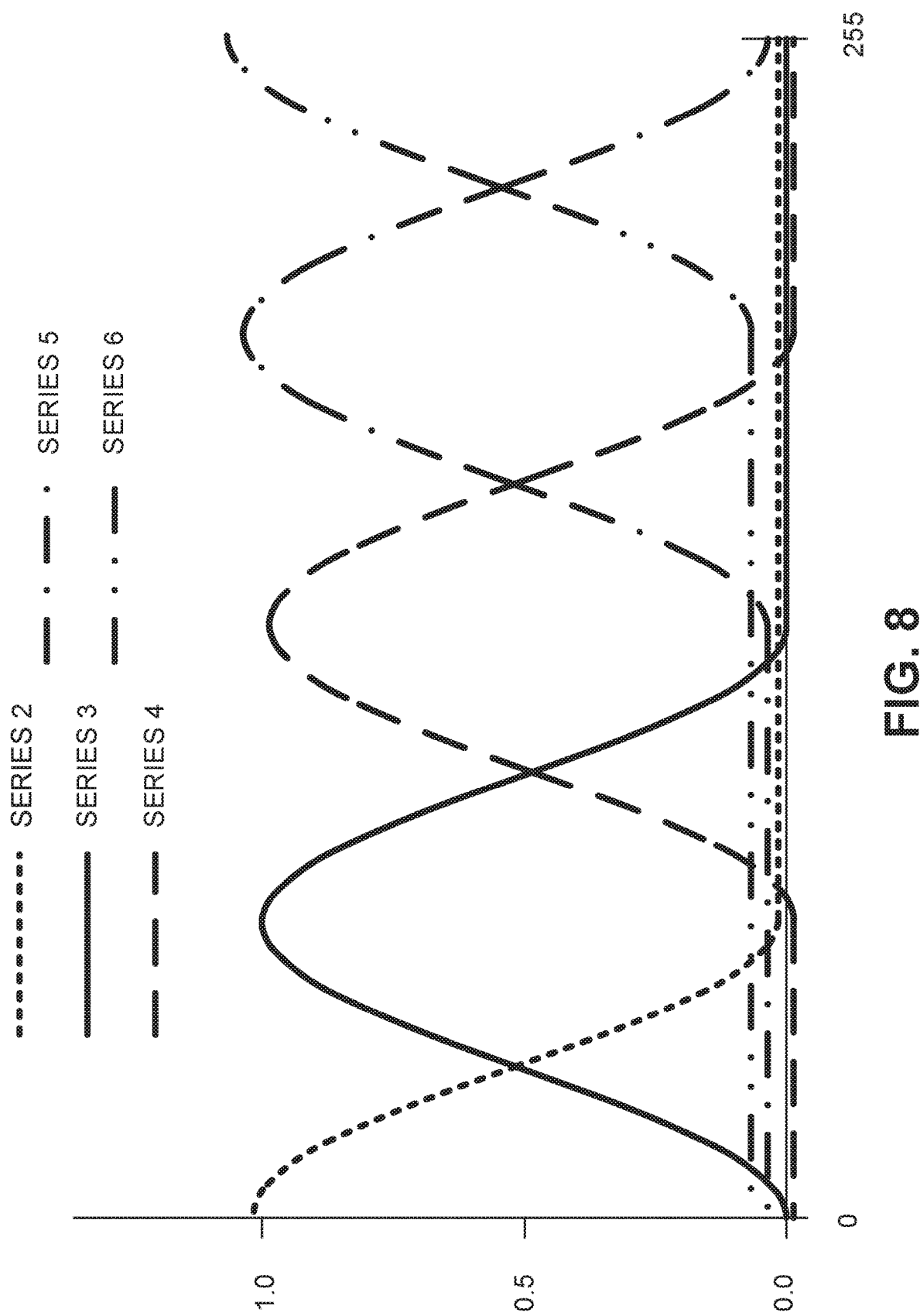
FIG. 8 illustrates sinusoidal functions producing weights for five MFPs (shown by different line patterns).

FIG. 8 shows correspondingly, how five image planes are formed using the two sinusoids shown in FIG. 6. It should be noted that, in the graph of FIG. 8 (and subsequently in FIGS. 9A-9B and 11A-11B), to make the different functions visible in places where their values overlap (particularly along the x-axis), a small offset has been introduced in the vertical direction. In the example of FIG. 8, the different series may be represented by the following expressions:

$w_2=0.5+0.5 \cos(4\pi x/255)$ for $x<\frac{1}{4}\cdot 255$, $w_2=0$ otherwise   Series 2:

$w_3=0.5-0.5 \cos(4\pi x/255)$ for $x<\frac{1}{2}\cdot 255$, $w_3=0$ otherwise   Series 3:

$w_4=0.5+0.5 \cos(4\pi x/255)$ for $\frac{1}{4}\cdot 255<x<\frac{3}{4}\cdot 255$, $w_4=0$ otherwise   Series 4:

$w_5=0.5-0.5 \cos(4\pi x/255)$ for $x>\frac{1}{2}\cdot 255$, $w_5=0$ otherwise   Series 5:

$w_6=0.5+0.5 \cos(4\pi x/255)$ for $x>\frac{3}{4}\cdot 255$, $w_6=0$ otherwise   Series 6:

Using the weight values in these series, a pixel with perceived luminance $L_0$ at depth x may be displayed using the following technique. The total perceived luminance $L_0$ is mapped to a perceived luminance of a corresponding pixel at each of the five image planes using the following formulas.

$$L_2=w_2(x)\cdot L_0$$

$$L_3=w_3(x)\cdot L_0$$

$$L_4=w_4(x)\cdot L_0$$

$$L_5=w_5(x)\cdot L_0$$

$$L_6=w_6(x)\cdot L_0$$

At each of the image planes, the appropriate pixel is illuminated with the respective calculated perceived luminance. Corresponding pixels in each image plane overlap with one another from the perspective of the viewer, giving the perception of a single pixel with perceived luminance $L_0$ at depth x.

In some embodiments, MFPs are calculated using a linear scale for depth, which corresponds to the output metrics of most depth capturing devices. In order to apply the dioptric spacing of MFPs, linear depth may be mapped to dioptric scale prior forming the MFPs. For exact mapping of scales, the smallest and furthest depths (distances from the eye) are determined, as described in greater detail below.

MFPs with sinusoidal blending functions separate well spatially. Their blending properties have some advantages of linear tent filters.

Unlike tent filters, sinusoidal blending does not show folds or other abrupt visible changes in MFP luminance distribution. Further, differing form tent filters, sinusoidal depth functions are smooth, so that their first derivatives are continuous over the whole depth range.

Embodiments Using Intermediate Focal Planes ("Patched MFPs")

A fixed composition of focal planes is not generally optimal. Fixed placement of MFP focal planes causes fixed quantization steps and fixed average error distribution along the depth scale. To address this issue, some embodiments operate to improve MFP rendering quality by time-multiplexing MPFs in alternate positions as a way to reduce quantization effects. In some such embodiments, there an alternation is performed between two different focal plane allocations for each two input images.

Figure 9A:
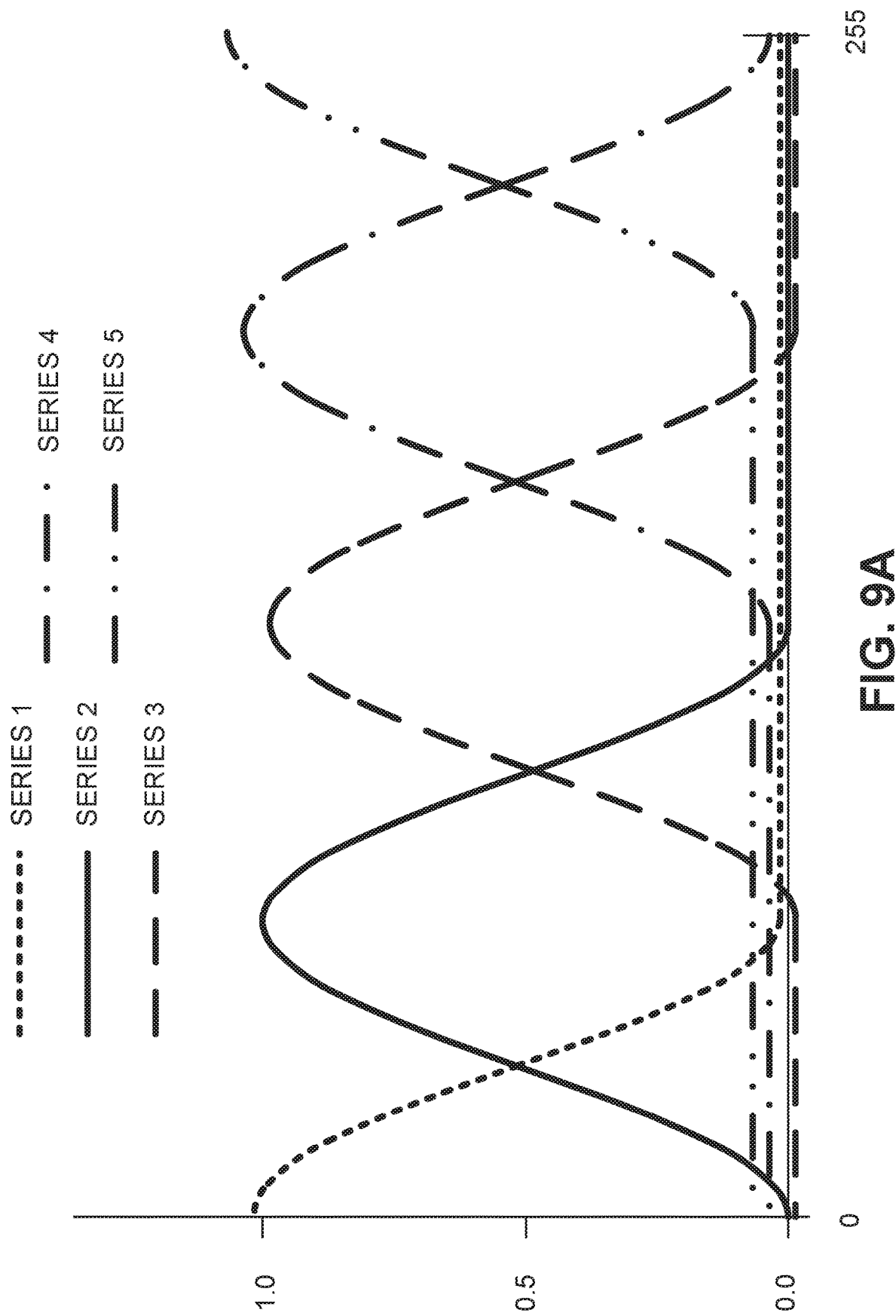
FIGS. 9A-9B illustrate alternating between five focal planes (FIG. 9A) and four focal planes (FIG. 9B), so that the latter four MFPs are positioned between the first five.
Figure 9B:
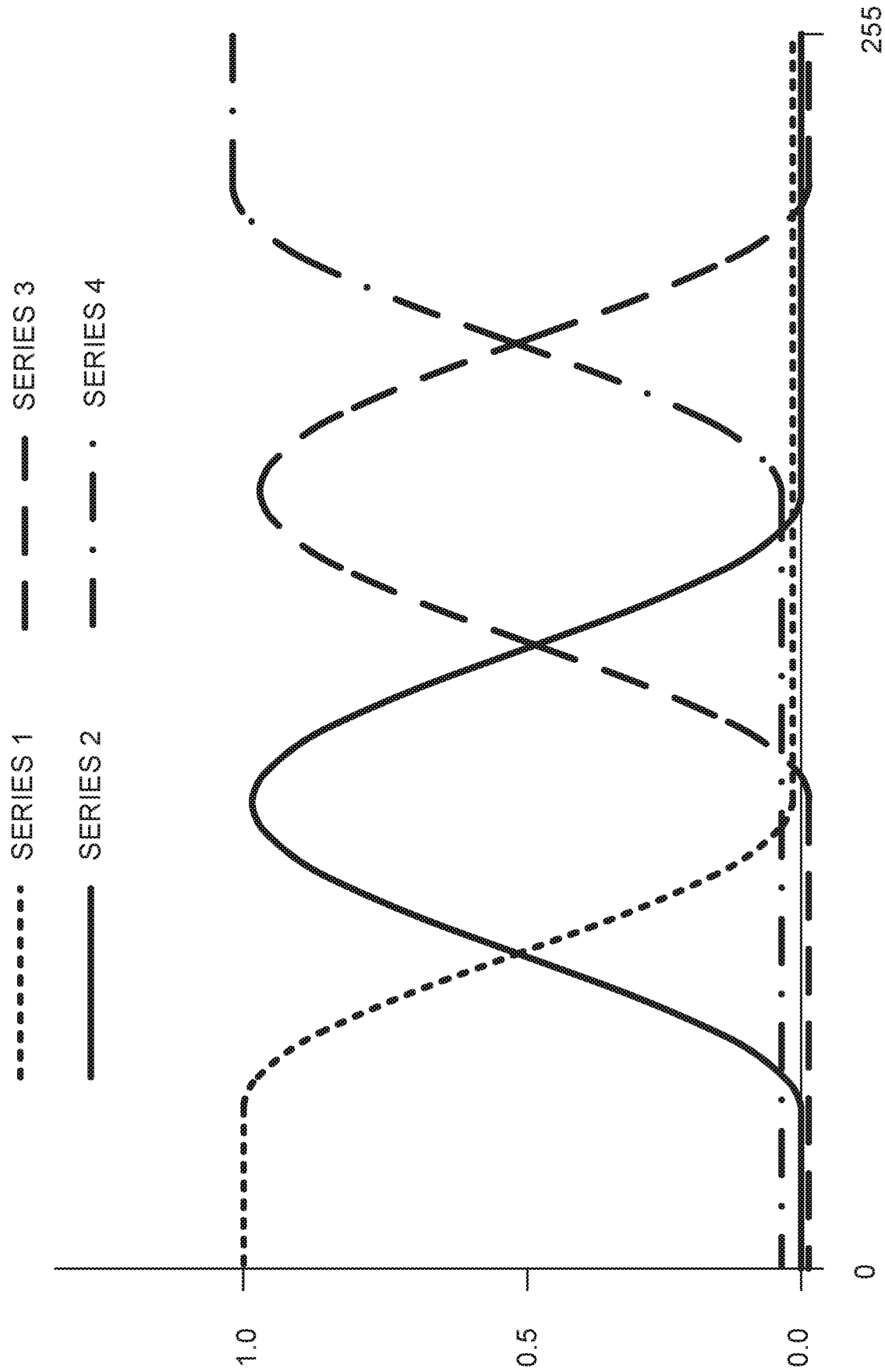

For example if the maximum supported and/or chosen number of MFPs is five, the five focal planes are used to compose a first image displayed in a first time interval. Subsequently, for a second image, four MFPs are rendered at interleaved depths between the previously rendered five MFPs. In total, nine locations for MFPs are used for rendering, which reduces the average quantization error and increases the perceived image quality. FIGS. 9A-9B illustrate the principle.

Weights for intermediate focal planes may be obtained by phase shifting the basic sinusoidal weight functions by a quarter of a wavelength. In some embodiments, for the outmost focal plane positions, which are not at either end of the depth scale, weight values are completed by repeating (extrapolating) with values 0 or 1.

Exemplary embodiments using this "patching" approach operate to increase the apparent number of focal planes and the perceived quality respectively, without exceeding a chosen maximum number of focal planes (five MFPs in the example).

Figure 10:
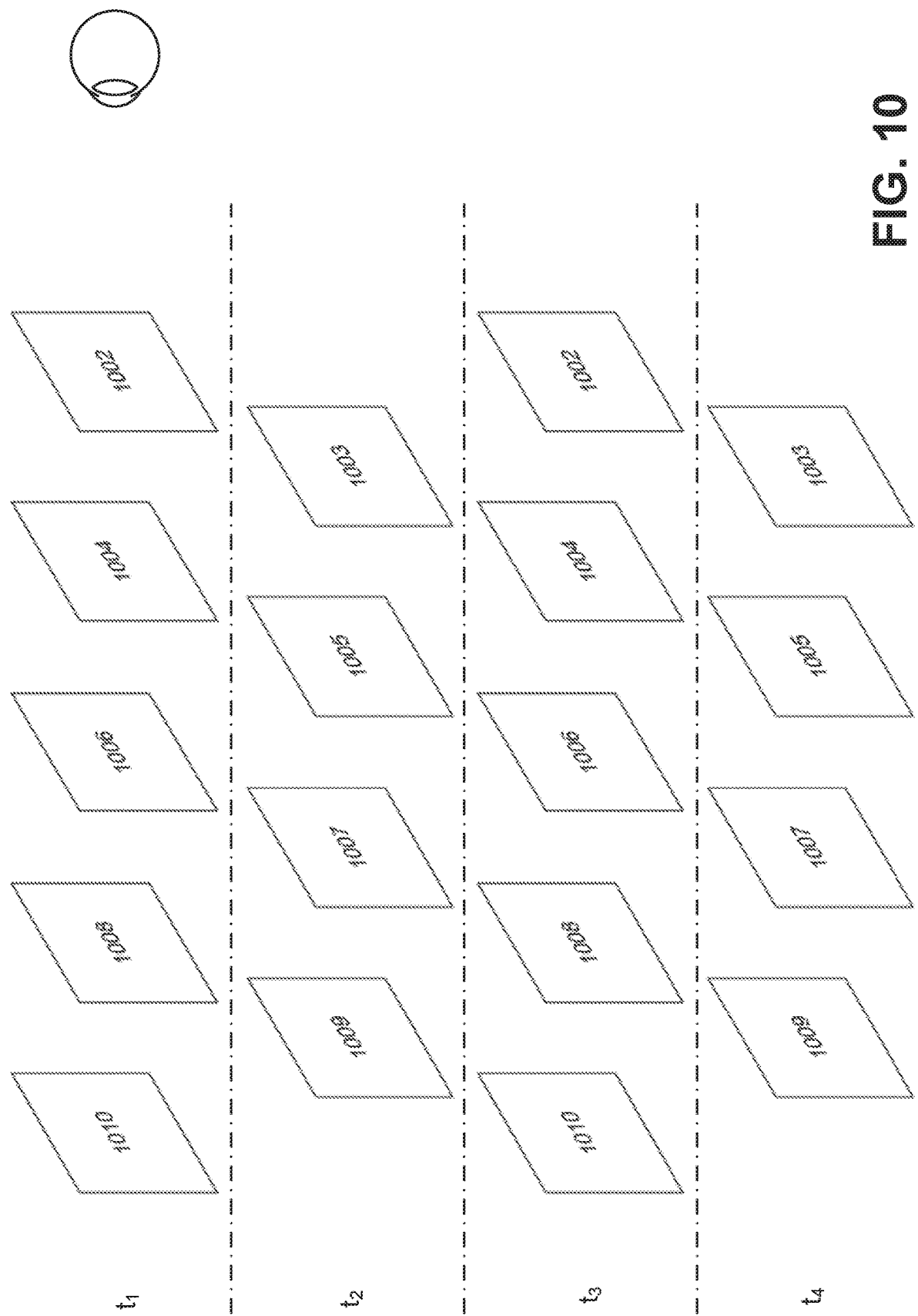
FIG. 10 illustrates an example of alternating between a stack of five and four MFPs as a function of time.

FIG. 10 illustrates the patching a set of five MFPs by a set of four intermediate MFPs as a function of time. An image is mapped to a set of five image planes 1002 (nearest the user's eye), 1004, 1006, 1008, and 1010. These five image planes are displayed to the user at a first time $t_1$. The image is also mapped to a set of four image planes 1003, 1005, 1007, and 1009. The set of four image planes is interleaved in distance with the set of five image planes. Specifically, the distance of plane 1003 is between those of planes 1002 and 1004, the distance of plane 1005 is between those of planes 1004 and 1006, the distance of plane 1007 is between those of planes 1006 and 1008, and the distance of plane 1009 is between those of planes 1008 and 1010. The set of four image planes is displayed to the user at a second time $t_2$ subsequent to time $t_1$. Display of the set of five image planes and the set of four image planes may alternate, with the set of five image planes being displayed again at time $t_3$ and the set of four image planes being displayed again at time $t_4$. Display of the set of five image planes and the set of four image planes may alternate at a rate sufficiently high that the change is not noticeable to the user, e.g. at least twenty-four times per second. Different numbers of planes may be used in different embodiments.

To avoid flickering, shifting of MFP stacks may be made between/for every rendered frame. Temporal properties of human visual system are slower for perceiving accommodation (depth) over spatial (or angular) changes, so in some embodiments, display framerate is unchanged despite of altering MFP positions.

Embodiments Using Interleaving (e.g. Doubling) of Focal Planes

Figure 11A:
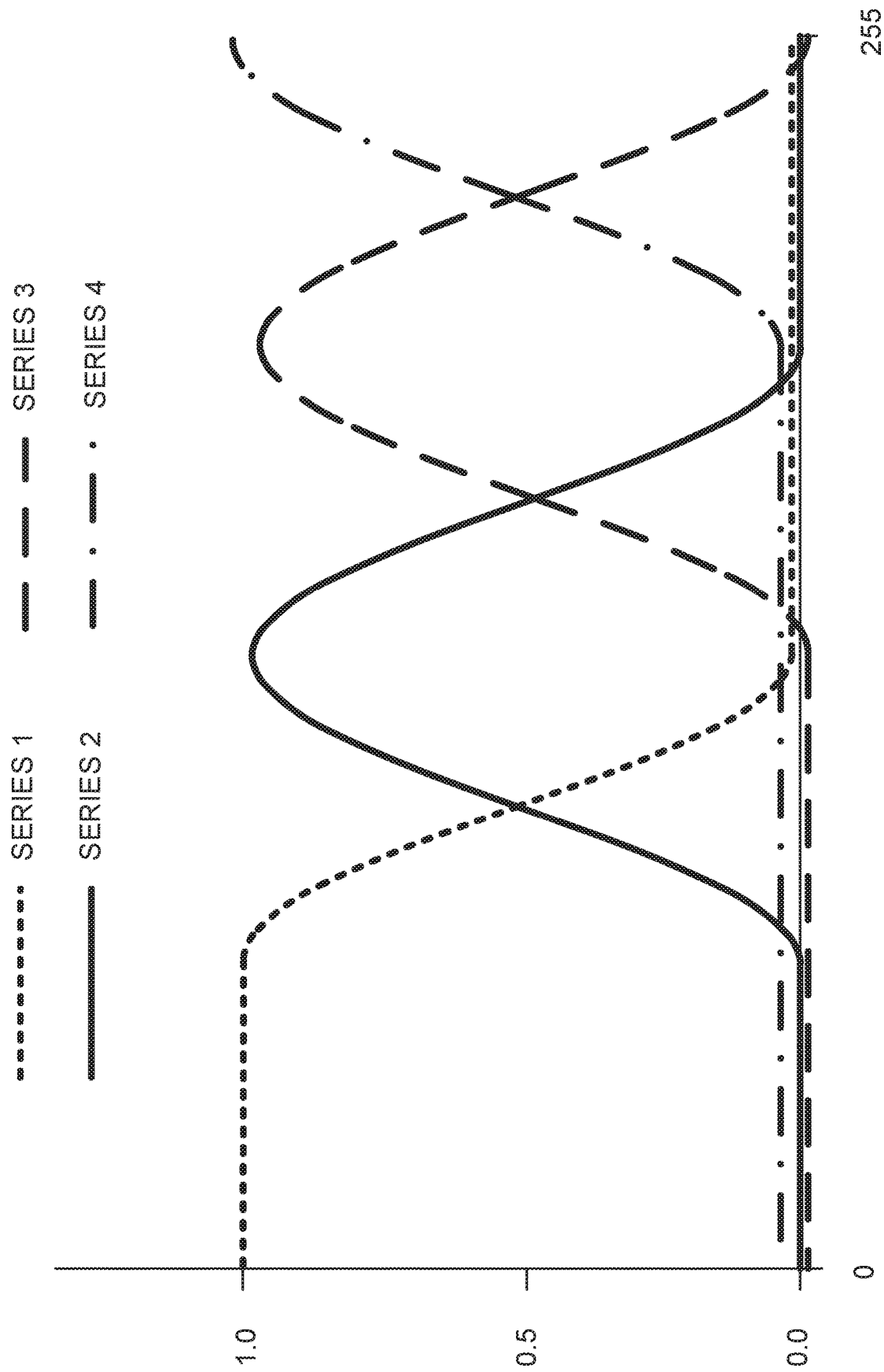
FIGS. 11A-11B illustrate alternating sets of MFPs in shifted positions.
Figure 11B:
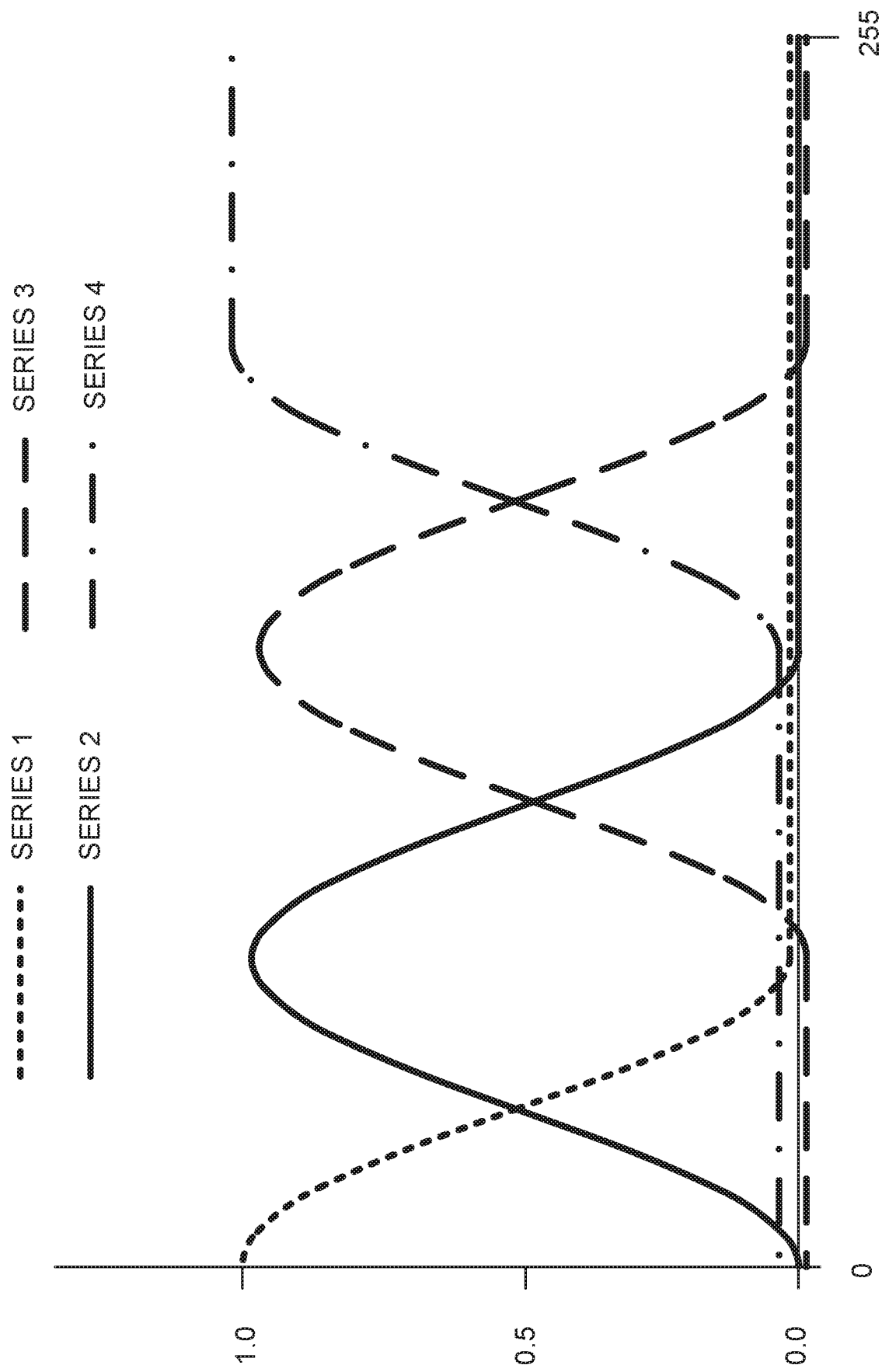

In some embodiments, the quality of MFP rendering may be increased by keeping a chosen maximum number of focal planes but alternating between two interleaved positions, so that the apparent number of MFPs is doubled. FIGS. 11A-11B illustrate example weight functions when using four MFPs. Weights for interleaving focal planes may again be obtained by phase shifting the basic sinusoidal weight functions by a quarter wavelength. For the outmost focal plane position, which is not at the end of the depth scale, weight values may be completed by repeating (extrapolating) with values 0 or 1.

Figure 12:
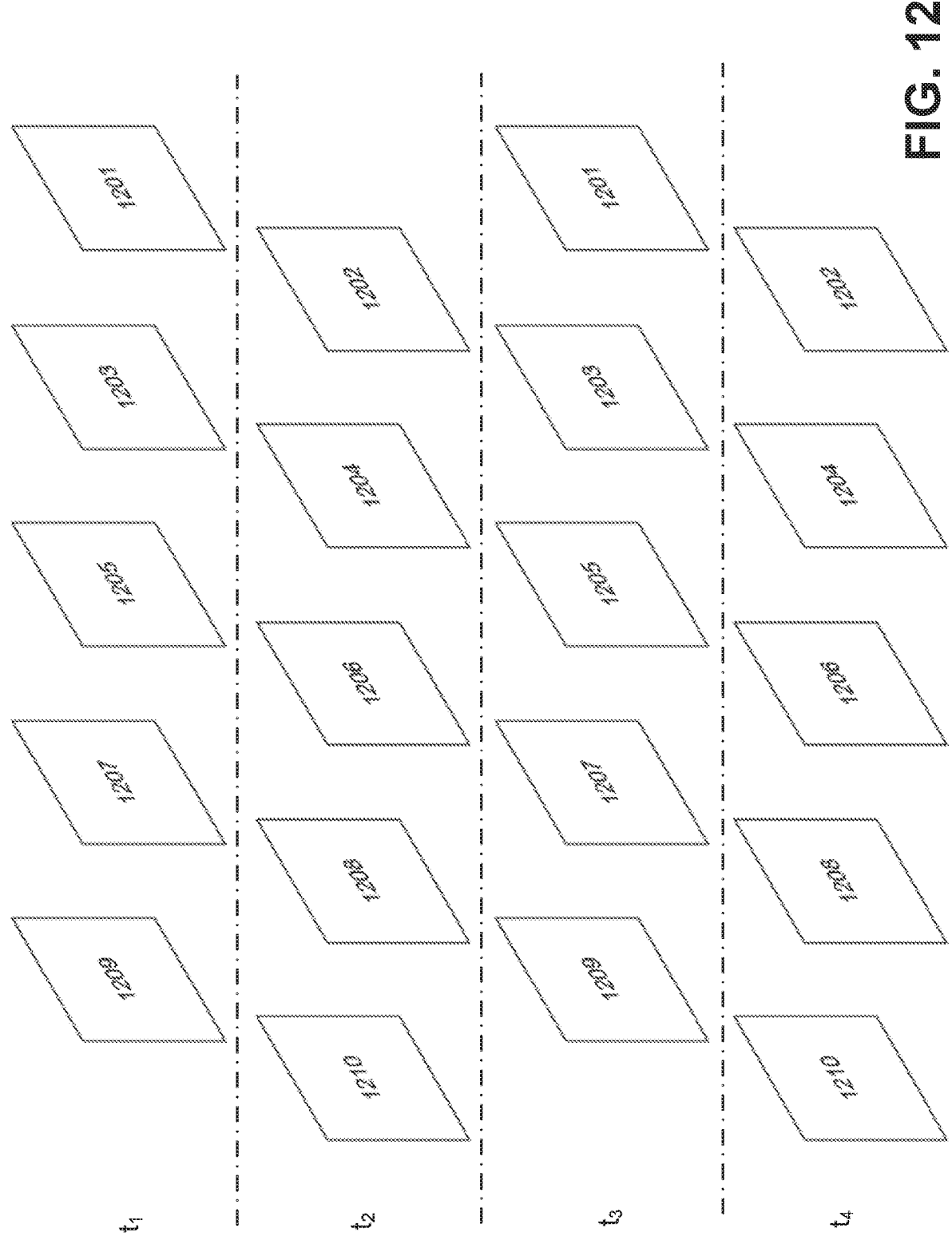
FIG. 12 illustrates an example of interleaving two stacks of four MFPs as a function of time.

An example of interleaved MFPs is shown in FIG. 12, when time-multiplexing five MFPs in intermediate positions. Display of a first set of image planes 1201, 1203, 1205, 1207, 1209 alternates with display of an interleaved second set of image planes 1202, 1204, 1206, 1208, 1210. The apparent number of focal planes is doubled (to ten, in this example), and the perceived accuracy is increased without increasing the chosen maximum number of focal planes (five, in this example).

Binocular Viewing: Alternating MFP Stacks for Each Eye.

Figure 13:
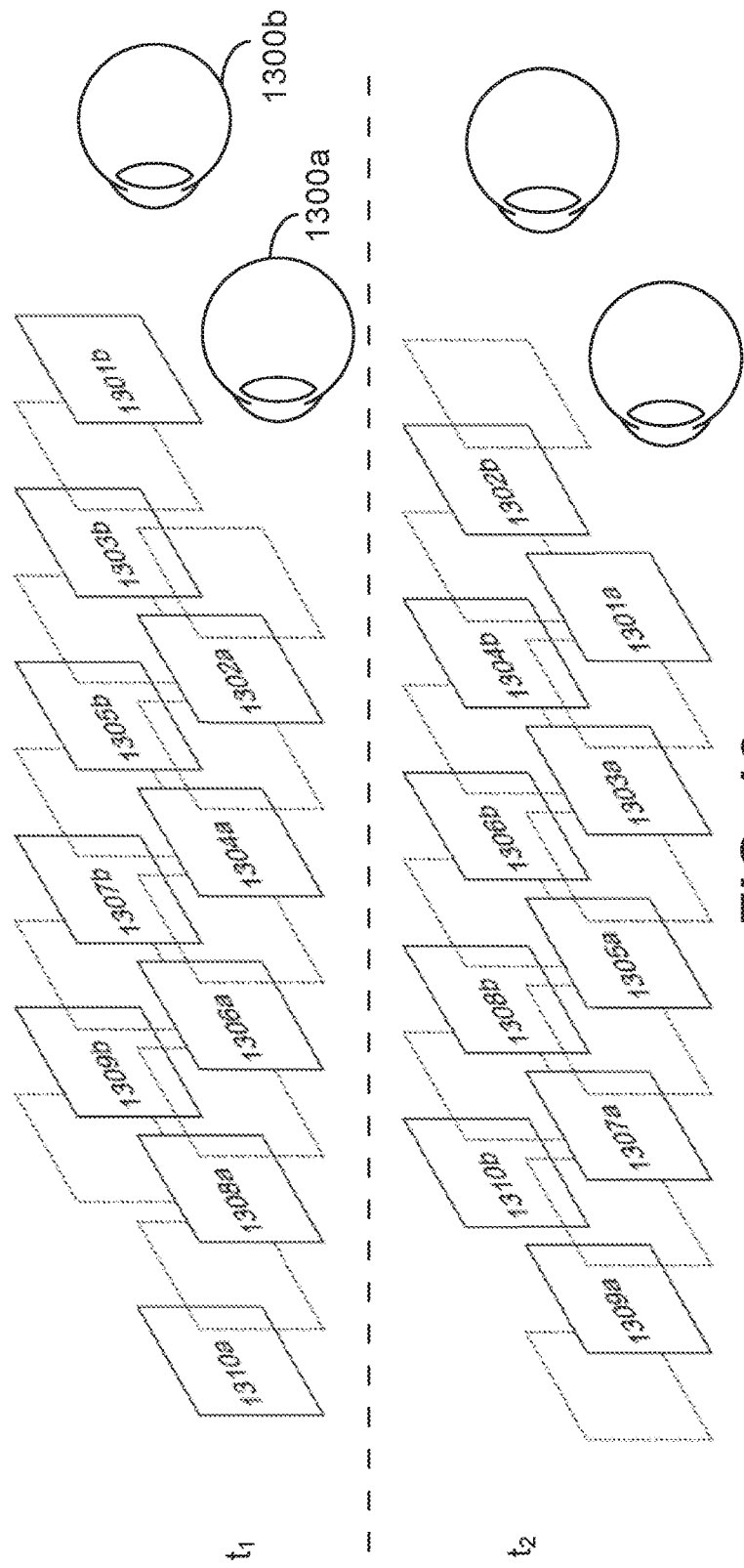
FIG. 13 illustrates an example of a binocular display operating to display two sets of interleaved MFPs at opposite phases to each eye.

In some embodiments, quantization effects in depth dimensions may be further reduced by alternating the two sets of MFPs in opposite phases for each eye. FIG. 13 illustrates one such method in the case of five interleaved MFPs. At time $t_1$, image planes 1302a, 1304a, 1306a, 1308a, and 1310a are displayed to the users left eye 1300a, and image planes 1301b, 1303b, 1305b, 1307b, and 1309b are displayed to the users right eye 1300b. At time $t_2$, image planes 1301a, 1303a, 1305a, 1307a, and 1309a are displayed to the users left eye and image planes 1302b, 1304b, 1306b, 1308b, and 1310b are displayed to the users right eye. The display may alternate rapidly between the configuration of time $t_1$ and the configuration of time $t_2$.

One benefit of alternating between two stack positions is that the averaging property of human eyes is exploited in a similar way as the so-called binocular fusion or monovision techniques. By using this property, the perceived depth of field for stereoscopic images may be extended by capturing image pairs with different focal distances (near and far). The same phenomenon may also be used to improve eyesight for people with presbyopia by prescribing them glasses (lenses) with different focal power.

Selecting a Number of MFPs

In K. J. MacKenzie et al., "Accommodation to multiple-focal-plane displays: Implications for improving stereoscopic displays and for accommodation control", Journal of Vision (2010) 10(8):22, pp. 1-20, using linear depth blending (tent filter), variations in focal distance resulted in continuous near-linear accommodation responses for image plane separations of up to 10/9 D. This suggests that five MFPs, distributed equally between 4 and 1/14 on dioptric scale (corresponding a metric distance between 0.25 m and 14 m), may be adequate for a practical 3D display.

In FIG. 8, blending functions were shown for five MFPs, distributed equally on the depth scale. If the corresponding depth scale is mapped for example between 4 and 1/14 on dioptric scale (corresponding a metric distance between 0.25 m and 14 m), the separation between focal planes is 0.98 D. Existing studies suggest that an adequate number of focal planes is in the order of five MFPs. Embodiments disclosed herein take the accuracy well to the safe side, without the need for using more complicated approaches.

Alternative Blending Functions.

Known blending functions include the so-called box filter and tent filter. In addition to them, several other variations may be used for blending filters, including those described in Xinda Hu (2014), "Development of the Depth-Fused Multi-Focal-Plane Display Technology", PhD Thesis, University of Arizona, 2014, and in Hu, X., & Hua, H. (2014), "Design and assessment of a depth-fused multi-focal-plane display prototype. IEEE/OSA Journal of Display Technology, 10(4), 308-316.

A beneficial feature of a set of blending functions is that they add up to one, in order not to cause variations in the overall luminance level of the rendered MFP stack. This is a property known as "partition of unity", which can be fulfilled with any number of functions.

As an example of blending functions that may be employed in embodiments as an alternative to the described sinusoidal functions may be built for example form a series of so-called bump functions $\psi: \mathbb{R} \to \mathbb{R}$ given by $$\Psi(x) = \begin{cases} \exp\left(-\dfrac{1}{1-x^2}\right) & \text{for } |x| < 1 \\ 0 & \text{otherwise} \end{cases}$$

and one or more complementary functions adding up to one. Further, blending functions may be composed from various smooth transition functions between 0 and 1, or 1 and 0, according to the following formula.

$$g(x) = \frac{f(x)}{f(x) + f(1-x)}, \quad x \in \mathbb{R},$$

Further, so called Friedrich's mollifiers (also known as approximations to the identity) may be used to create sequences of smooth functions for depth-weighted blending.

The above are just examples, and alternative sets of blending functions may be employed with exemplary embodiments.

Aligning Linear and Dioptric Scales.

The human visual system favors placing focal planes at regular distances on dioptric scale. However, depth information is usually easiest to capture in a linear scale. Ideally, the position and scale of the linear depth range are known. Often, though, the linear scale is relational, varying between some smallest and largest distance of the scene, without information on the actual metric span.

On the other hand, the depth perception of a human eye is more absolute, starting from a viewers eye-position and continuing to infinity. When using linearly captured depth information in MFP near-eye displays, it is helpful to identify the closest and furthest rendering distances from the eye (in dioptric scale) and to map/align the linearly captured depth to that range.

Without information on the absolute scale and span of the linear depth, depth perception cannot generally be real and exact. This is especially the case when receiving content (e.g. video plus depth) from different sources. Despite this, the above-mentioned binding and mapping between linear and dioptric depth scales may be performed according to an assumption in order to optimize the placing of discrete focal planes.

The relation between dioptric depth $D(x)$ and linear normalized depth x may be expressed as follows:

$$D(x) = (x \cdot z_{min} + (1-x) \cdot z_{max})^{-1}, \text{ where } x=[0,1], \text{ and}$$
$$D_{min} = 1/z_{max}, \text{ and } D_{max} = 1/z_{min}.$$

Here, x=0 is the largest depth and x=1 is the smallest depth in the scene. The depth can easily be scaled from 0 to 255 for depth maps with 8 bit resolution.

Note that, for simplicity, the examples of MFPs in FIGS. 10, 12, and 13 were formed using a linear depth scale, although other depth scales may alternatively be used.

Forming and Rendering MFPs in Content-Dependent Positions.

In some embodiments making use of time-varying focal planes, the MFPs are positioned depending on the displayed content. The positioning of focal planes then depends on the characteristics of each input image to be displayed.

If for example an input image is clustered around certain depth levels or zones, it is beneficial, relating the rendering accuracy, to position focal planes around those clusters. When using for example a set of sinusoidal blending functions, their dioptric separation is primarily some constant.

Correspondingly, content-based optimization may be done for the complete set of MFPs at a time.

Both the number and positions of focal planes may vary depending on content. Applying the above described processes, for example, a section of sinusoidal blending functions (each basically containing weights inside one half-wavelength) may be extracted and shifted to any position on the depth scale. Correspondingly, neighboring sections of waves can be stretched (by repetition of weight values), to fulfil the partition-of-unity property.

Figure 14:
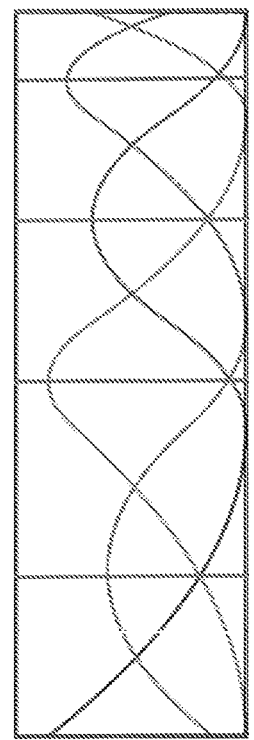
FIG. 14 illustrates a set of B-spline basis functions that are used as blending functions in some embodiments.

As an alternative to sinusoidal blending functions used in most of the examples described above, exemplary embodiments can be applied also with other blending functions (e.g. when using tent, non-linear, bump, polynomial, or other filters). FIG. 14 illustrates a set of B-spline basis functions that satisfy the partition-of-unity condition and can be used as blending functions in some embodiments. As is evident from FIG. 14, the blending functions do not need to be symmetrical or to reach the maximum weight value 1.

Different techniques for forming content-adaptive MFPs may be used in different embodiments. Histogram analysis may be performed in some embodiments to derive content properties. Various techniques may be used to specify metrics and rules for optimizing focal plane positions. The rules may also make use of different models for visual perception, such as those described in W. Wu et al., "Content-adaptive focus configuration for near-eye multi-focal displays", Proc. IEEE Int. Conf. Multimedia Expo (ICME), July 2016. In other embodiments, however, the selection of image plane distances is independent of the content being displayed.

Time-Multiplexing MPFs in Shifted Positions.

FIG. 15A illustrates a method of time-multiplexing MPFs in shifted positions. In step 1502, image content is captured with a camera (e.g. a depth camera). In step 1504, a depth map of the image content is created. In step 1506, the image content is mapped to different stacks of image planes based on the depth map. The different stacks of image planes are time-multiplexed (step 1508) and rendered (step 1510) for display to a user.

FIG. 15B illustrates another method of time-multiplexing MPFs in shifted positions. 3D content is captured (step 1512) and reconstructed (step 1514). In step 1516, the image content is mapped to different stacks of image planes based on the depth map. The different stacks of image planes are time-multiplexed (step 1518) and rendered (step 1520) for display to a user. FIG. 15C illustrates a case when 3D modeled content 1522 (e.g. full VR scene or an AR object) is used as input to forming MFPs (step 1524). When forming MFPs of virtually modeled content, corresponding 3D content is available without capture and reconstruction steps (cf. FIG. 15B). The different stacks of image planes are time-multiplexed (step 1526) and rendered (step 1528) for display to a user.

In some embodiments, instead of texture and depth videos, image information may be captured and transmitted as real-time 3D data. This may affect to the formation of MFPs at the receiving site.

Forming the stacks of MFPs may be done by "patching" or "interleaving", as described in greater detail above.

One technique for forming blending functions that may be used in different embodiments includes the following steps.
Choose the continuous sinusoidal functions in opposite phases as basic functions.
Adjust the basic functions to the desired depth range.
Adjust the wavelength of the basic functions to produce a chosen number of focal planes, and
Calculate the table of weights for the two complementary basic function, producing weights for each depth value.
Split the values in the table of weights according to the chosen number of MFPs.
Complement the values at the ends of the depth scale by extrapolating the value at the outmost focal plane.

In the case of "patching," this technique results in a set of n MFPs, patched with another set of (n−1) MFPs in intermediate positions, for a total of 2n−1 MFPs. In the case of "interleaving," this technique results in two sets of n MFPs, interleaving each other (shifted by a quarter wavelength on the depth scale). In either case, in some embodiments, the weights of (split and completed) blending functions sum up to one over the whole depth range, i.e. they form a "partition of unity".

Exemplary Optical Structure for a Vari-Focal Time Multiplexed Embodiment.

A display device on which exemplary embodiments are implemented may take various forms in different embodiments. One such display device is described in S. Liu et al., "A Novel Prototype for an Optical See-Through Head-Mounted Display with Addressable Focus Cues", IEEE Transactions on Visualization and Computer Graphics, vol. 16, no. 3, May/June 2010, pp. 381-393. Liu et. al describe a solution for optical see-through AR glasses. This solution avoids problems of transparency by placing a physical display aside from the viewer's optical path. Using this structure, the displayed images are virtual images, which do not block each other like physical displays. In the device of Liu et al., the focal length of a controllable (liquid) lens is adjusted to provide different virtual focal planes. An optical structure that may be used for display of different image planes is shown in FIG. 16. In the optical structure of FIG. 16, a microdisplay 1602 displays an image. Light from the display passes through an adjustable lens 1604 and through a half-silvered mirror 1606 before being reflected by a mirror 1608 (which may be a concave mirror). The light reflected by the mirror 1608 is again reflected by the half-silvered mirror 1606 into the user's eye 1610. The user may be able to view the exterior environment through the half-silvered mirror 1606. The lens 1604 and the mirror 1608 form an image (e.g. image 1612) of the microdisplay 1602 at a position determined by the optical powers of the adjustable lens 1604 and the mirror 1608.

Using a display device such as that of FIG. 16, rendering of any number of focal planes (e.g. five) can be performed in a time-multiplexed manner with an appropriate speed and brightness of the display and lens. The vari-focal lens 1604 has a continuous range of focal lengths, and multiple focal planes are rendered at varying distances (with varying optical power of the lens). In alternative embodiments, multiple focal planes may be implemented using for example free-form lenses/waveguides in order to achieve compact enough display structure, e.g. using techniques described in D. Cheng et al., "Design of an optical see-through head-mounted display with a low f-number and large field of view using a free-form prism," Appl. Opt. 48, 2009, pp. 2655-2668.

In some embodiments, a pair of varifocal lenses are placed in series so that one is rendering the basic set of MFPs, e.g. five, and the other (e.g. birefringent) one is alternating the stack into intermediate positions.

Exemplary Method.

Figure 17:
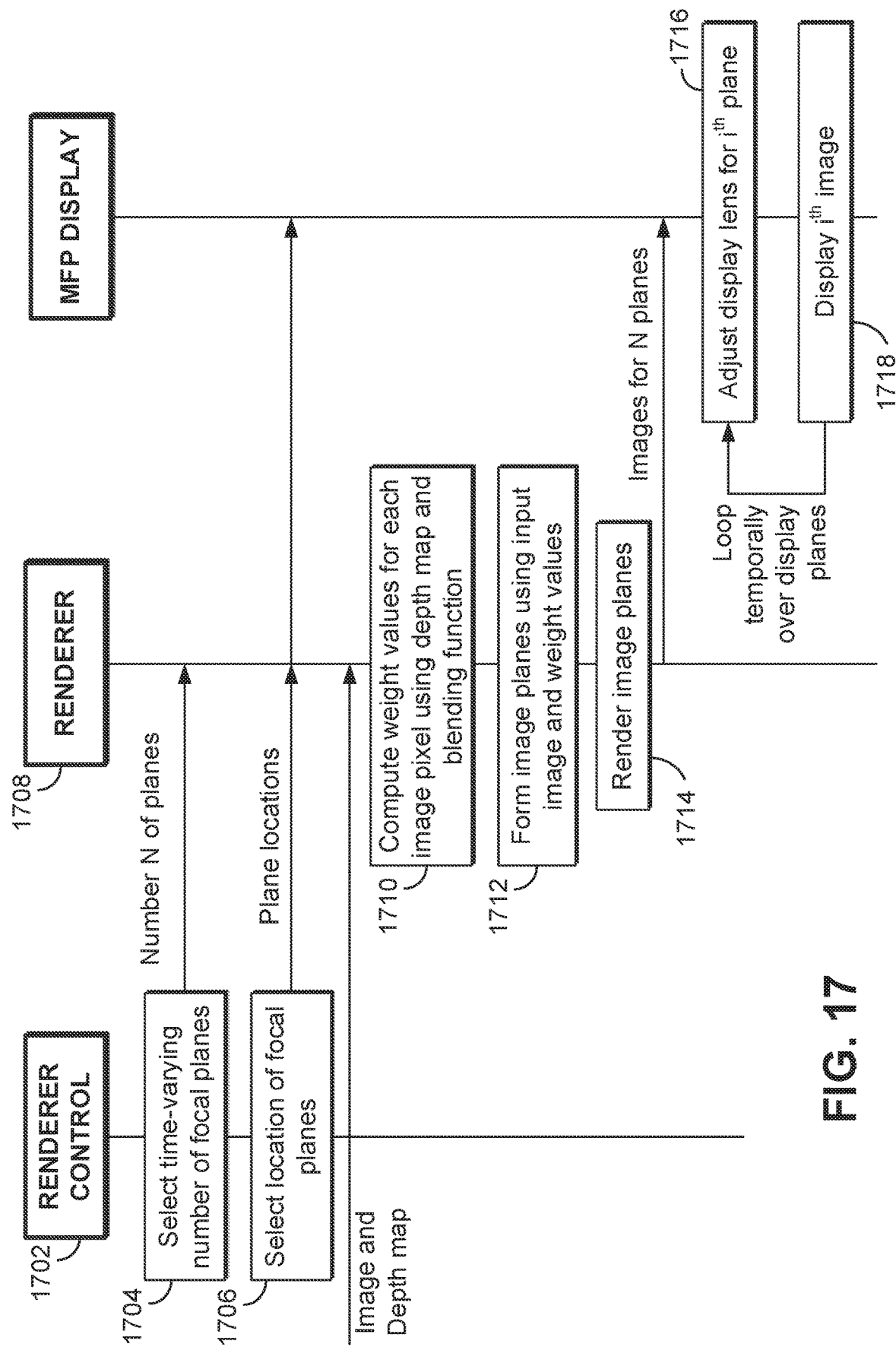
FIG. 17 is a message flow diagram illustrating a method performed in an exemplary embodiment.

An exemplary method is illustrated in FIG. 17. In the method of FIG. 17, a renderer control module 1702 selects a number N of focal planes (step 1704). The number may be time-varying. The renderer control further selects a location (depth) for each of the focal planes (step 1706). These selections may be based on the content of a depth map for the image to be rendered, or the selections may be content-independent (e.g. based on the physical capabilities of the corresponding display device). The number and location of the focal planes are provided to a renderer 1708. The renderer also receives the depth map and the image to be rendered. The renderer uses the depth map (and appropriate blending functions) in step 1710 to form weights for forming each individual image plane (focal plane). The renderer forms (step 1712) and renders (step 1714) individual image planes and provides them to an MFP display. The MFP display loops over the display planes, adjusting the lens (or other adjustable display optics) for each display plane (step 1716) and displaying the image plane at the corresponding respective depth (step 1718). Note that in this exemplary method, every image plane (step 1718) is displayed at a different time instant, making also used sets of focal planes (patched or doubled) sequential, instead of simultaneous as described earlier. For optimal precision, texture and depth captures for forming corresponding sets of sequential focal planes may be taken also sequentially.

Optical-See-Through Display Devices.

Further disclosed herein are multiple focal plane (MFP) displays that use a varifocal approach and time multiplexing for rendering of multiple focal planes. In some embodiments, changing focal distances is made by using electronically-controllable varifocal lenses. Using electronic lenses avoids the need of mechanical actuators, and enables structural multiplexing of several lens systems.

The term structural multiplexing is used herein to refer to the use of multiple varifocal lens configurations or layouts that occupy the same physical section of the optical pipeline. At each time, a chosen lens system is configured by activating and deactivating electronic lenses as required.

In some embodiments, most components of the rendering system can be shared and kept in fixed positions, potentially simplifying the implementation.

Some embodiments provide for an overlay of eye-points (i.e. without offset). Variations are also described, with these variations making specific trade-offs for achieving a better form factor for the implementation (e.g. by allowing some eye-offset, omitting background occlusions, or using direct occlusions).

Stereoscopic 3D.

Stereoscopic display is a common way to show 3D information (often referred as stereoscopic 3D or S3D). Stereoscopic viewing is based on capturing parallel views—a stereo pair—by two cameras, separated by a small distance, called the stereo baseline. The capture setup mimics the binocular image perception by two human eyes. This technology has been popularized through use in 3D cinema, 3DTV, as well as in augmented and virtual reality applications (AR and VR). In AR/VR, wearable near-eye displays (sometimes called glasses) are commonly used.

In a real-world space, human eyes are able to scan freely and to pick information by focusing and accommodating to different distances/depths. When viewing, the vergence of the eyes varies between seeing to parallel directions (for distant objects) and seeing to very crossed directions (for objects close to the eyes). Convergence and accommodation are very strongly coupled, so that most of the time, by nature, the accommodation/focal points and the convergence point of the two eyes meet at the same 3D point.

In conventional stereoscopic viewing, the eyes are always focused on the same image/display plane, while the human visual system (HVS) and the brain form the 3D perception by detecting the disparity of the images, i.e. the small distances of corresponding images in the two 2D projections. In stereoscopic viewing, vergence and accommodation points may be different, which causes vergence-accommodation conflict (VAC). Although VAC is known to cause visual strain and other types of discomfort, conventional stereoscopy is still the most commonly used approach in near eye displays due to its facility and cost-effectiveness.

Multifocal Plane Displays.

In multifocal plane (MFP) displays, a viewer is able to focus at different objects and depths, which avoids the VAC typical for stereoscopic displays. A stack of (natural or virtual) focal plane images are rendered at different depths; the one being observed is seen in focus, and the other ones are blurred naturally by the human visual system. MFP displays show a stack of discrete focal planes, composing a 3D scene from layers along a viewers visual axis.

Multiple focal planes are primarily complementary—not additive—in transverse directions from a viewing axis. Additive effects may, however, smooth out quantization steps and contouring that might the otherwise be perceived when seeing views compiled from discrete focal planes.

Multiple focal planes may be displayed either by spatially multiplexing a stack of 2-D displays, or by sequentially switching—in a time-multiplexed way—the focal distance of a single 2-D display by a high-speed varifocal element (VFE), while spatially rendering the visible parts of corresponding multifocal image frames. Each image in a stack of (virtual) focal planes is rendered at a different depth, and the eye blurs those focal planes not being observed.

Near-Eye Binocular Viewing Using Two MFP Stacks.

As with conventional stereoscopic near-eye displays showing side-by-side stereo images, two MFP stacks are used to support stereoscopy in near-eye MFP glasses. These two stacks may be formed from stereoscopic input signals or synthesized from a monoscopic input for texture and depth (video plus depth).

Using monoscopic input signals, one MFP stack is first produced, and then split into two MFP stacks from two slightly differing (stereoscopic) viewpoints. Splitting is made by transforming the monoscopic MFP stack from its nominal rendering direction to the two new viewpoints, one for each eye. This is comparable with synthesizing stereoscopic viewpoints by 3D warping in depth-image-based rendering (DIBR) systems.

Issues with Some MFP Display Stacks.

Figure 2:
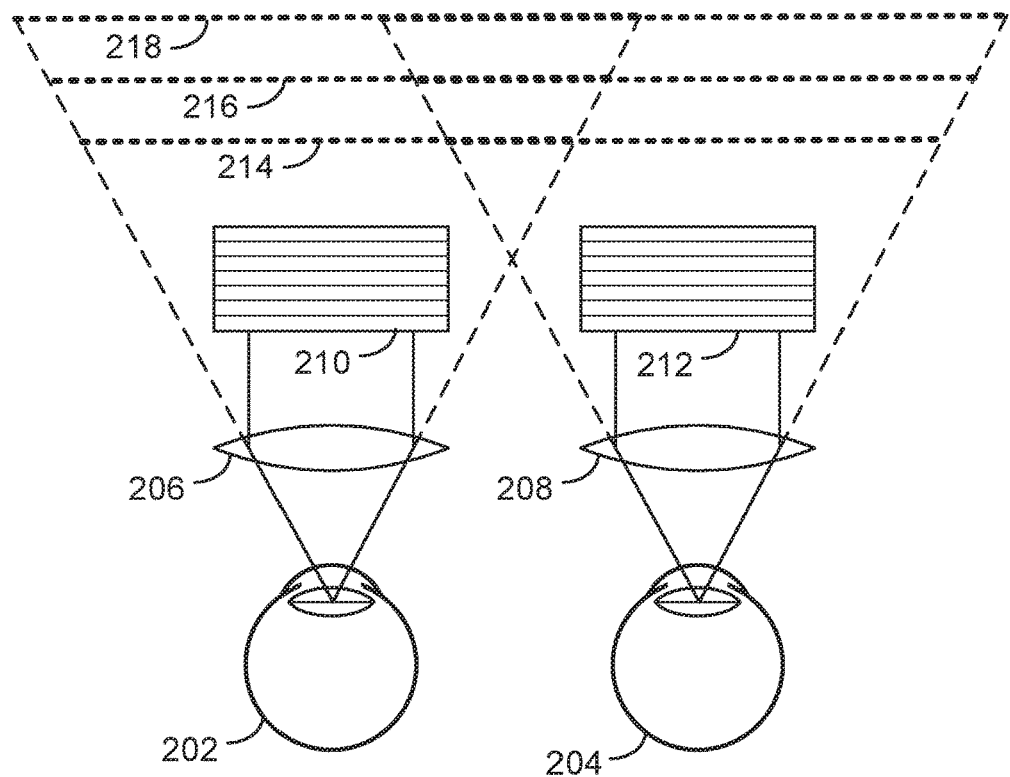
FIG. 2 is a schematic illustration of a multi-focal near-eye display.
Figure 3:
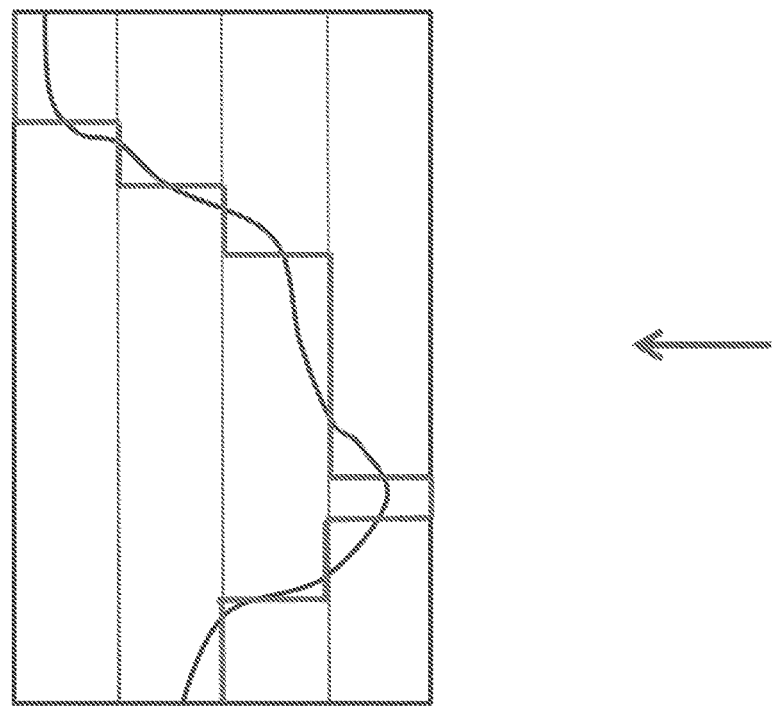
FIG. 3 illustrates a schematic example of the quantization of depth when describing a view by five focal planes. An arrow shows the viewing direction.

An MFP display may in principle be implemented by stacking focus plane displays as shown in FIG. 2. Using this approach for an optical-see-through display may have one or more of the following issues. First, eyepiece optics can change the geometry of the real-world view and should be compensated optically to provide an optical-see-through effect. This increases the complexity and size of the implementation. Second, ideally, each focal plane would be associated with a respective blocker for occluding the background view. Otherwise, occlusion leak between augmented and real elements is possible. Occlusion leak is produced by typically too close placement of the blocker, when omitting optical components (for better form factor) rendering the occlusion mask further away. A non-ideal placement of the blocker blurs the edges of the occluded area. Third, each blocker or display element increases complexity, reduces brightness and contrast, and may cause distortions e.g. due to mutual interference.

Time-multiplexing of focal planes removes cross distortions between display elements, but it may cause flicker and loss of brightness. Time-multiplexing may reduce complexity due to managing with a smaller number of components.

Varifocal Near-Eye Displays.

A varifocal display approach can avoid the VAC problem by dynamically compensating the focal distance of a single-plane display to match it with the convergence depth of the eye. The focus compensation may be achieved by mechanical actuators zooming the eyepiece of the display, or adjusting the distance between the microdisplay and the eyepiece. Instead of zooming the eyepiece focus through mechanically adjustable parts, a range of electronically controlled active optical elements can be used, including liquid lenses, deformable mirrors, and/or liquid crystal lenses.

Eye tracking has been used for determining an appropriate focal distance and adjusting the position of the focal planes accordingly. However, eye-tracking generally requires additional hardware, is computationally intensive, accuracy demanding, and challenging operation to implement.

In some devices, varifocal implementations render focal planes at different distances in time-multiplexed way. In such devices, focal distance is adjusted sequentially, and the corresponding focal plane is rendered at each distance. Time multiplexing eases up the implementation, but may suffer from brightness loss. The benefit of time-multiplexed varifocal approach is the simplicity of the display structure compared to many other MFP approaches.

An Electronically Controllable Varifocal Lens.

Varifocal optics may be implemented using movable lenses inside the optical system. For time-multiplexing several focal planes, mechanically moving parts may not be fast enough. Electronically controllable optical elements, however, can avoid the need to mechanically move components inside an optical system.

Several techniques are available to implement variable focal length lenses with electronic controllable optical properties. One is the liquid lens, in which a transparent liquid like substance is put in between two mechanically deformable films. Mechanical actuators are used to control the tension, adjusting the optical power of the lens. Although this type of lenses has been successfully used in prototype implementations of near-eye displays, their use is restricted by the typically large mechanical size and high power for controlling the tension defining the optical power. Deformable mirrors can be constructed and used in an analogous way to liquid lenses.

Other techniques use the properties of liquid crystal materials and apply a control voltage to orient a number of elementary liquid crystal lenses. Virtual reality types of video-see-through lenses are more demanding in practice, due to typically requiring a larger lens to support wide enough field-of-view (FoV). In augmented reality glasses, only part of the view is typically supported to display augmented objects or content, and may be implemented using a smaller lens.

The structure of the lens determines its speed and overall optical power range. For example, liquid crystal lenses may be arranged in a Fresnel style of lens to increase the speed of changing focus, and liquid crystal lenses may be stacked to increase the range of available adjustments.

Video-See-Through Versus Optical-See-Through Displays.

Video see-through near-eye-displays (NEDs) are used for viewing virtual or captured content or their combinations (AR content) in applications, where the content is supposed to fill much of the user's field of view and to replace the users real-world view. Virtual games and stored or streamed 360 panoramas are examples of this category. Often, the content is shown on one focal plane, which may induce VAC. Supporting multiple focal planes allows for reduction or avoidance of VAC, which is a considerable benefit.

Supporting see-through displays is a considerable challenge. There are two notably different levels in achieving this goal. Many current approaches add virtual information over the real-world background without occluding (replacing) the latter, resulting with a ghost like transparency and color distortions in the rendering. It is more desirable to support occlusions by both blocking the light from the desired parts of the real view and augmenting virtual information on these blocked areas. In most existing systems, blocking is implemented only for one focal plane.

Note that background occlusion, in which virtual information blocks real-world objects, may not be enough for seamlessly merging virtual components into real-world views. In addition, foreground occlusion may be useful. In foreground occlusion, virtual information rendered at specified depths is occluded by those real-world objects in front of it. Background and foreground occlusions together may be referred to as mutual occlusions.

By detecting a marker or a set of features by a camera, an augmentation can be rendered. In addition, by using a blocker element, such as a spatial light modulator (SLM) to block the real-world view, background occlusion can be made. Note that supporting background occlusions does not require depth sensing of the view by depth sensors. However, if the virtual information in turn is desired to be occluded by real-world objects, it is beneficial to capture more 3D properties from the view than just the pose for the augmentation. For supporting foreground occlusions, using depth sensors is thus beneficial.

An Example Optical-See-Through (OST) Display Implementation

An example of an optical-see-through near-eye display is shown in FIG. 18A. The example of FIG. 18A is given for a solution rendering only one focal plane. The implementation includes an objective lens 1802, inverting lenses 1804 and 1806, and an eyepiece lens 1808. A blocking layer 1810 (e.g. a spatial light modulator) is positioned between the inverting lenses and the eyepiece lens. A display component 1812, such as an LCD display or OLED display, is provided for displaying virtual content, and an optical combiner 1814 (e.g. a partially-silvered mirror) is provided to combine images from the real world (as received through lenses 1802, 1804, and 1806) with images generated by the display component 1812.

The eyepiece lens is provided for collapsing (compacting) the real view for occlusions (cf. blocker) and augmentations (cf. focal plane display).

The blocker, which may be a liquid crystal (LC) element is provided for areas to be replaced (occluded) on the focal plane.

The augmentation display component 1812 is provided for displaying focal planes of the augmented object.

The optical combiner 1814 (e.g. a dichroic mirror) is provided to reflect the augmented information.

The lenses 1802, 1804, 1806, and 1808 retain the natural orientation of the view of the real world. In FIG. 18A, a users eye 1816 is at a position referred to here as the real eye-point. In practice, the user experiences (perceives) a virtual eye-point more front in the optical path than the real eye-point, as discussed in greater detail below. The separation between the real and virtual eye-points is referred to here as the viewpoint- or eye-offset. Especially for close range viewing, a small offset is preferable.

Preferably, in an optical see-through solution, the real view is not scaled, i.e. the magnification of the system is 1:1. In the example of FIG. 18A, lenses with the same optical power are shown to be used, although in some embodiments, the two inverting/erection lenses may have a different optical power (and distance) compared to the two lenses close to the eye or the two inverting lenses may be replaced with a single inverting lens.

Collimated sections with parallel rays, such as the section between inverting lenses 1804 and 1806, give flexibility to the positioning of the section for occlusions and augmentations, and for choosing a physical length for the entire optical system.

The display device of FIG. 18A operates to form only one occlusion-capable focal plane. In addition to lacking support for multiple MFP rendering, the simplified implementation uses a relatively long optical pipeline. This causes a large viewpoint/eye offset, which is especially disruptive for viewing of and interaction with nearby objects.

Issues with Some Display Implementations.

Some current MFP solutions for optical see-through near-eye displays do not support natural occlusion with multiple focal planes.

Current solutions for occlusion capable optical see-through NEDs, even only supporting one focal plane, typically suffer from an offset between real eye positions and perceived eye positions (virtual eye-positions determined by the NED optics).

Inflexibility of system architecture generally hinders achieving a satisfactory form factor for a system implementation. Combining parallel optical structures for rendering multiple focal planes works in principle, but exemplifies the challenge of reaching a compact result.

OST Displays with Support for Occlusion.

Embodiments of displays disclosed herein are described by setting forth the structure for single eye, although it is to be understood that the optical structures provided for one eye are duplicated for the user's other eye in many embodiments to generate a full stereoscopic display. Information may be captured, processed and displayed separately for each eye for implementations that include two parallel pipelines and structures.

Note that virtual viewpoint generation may also be chosen to support stereopsis (instead of capturing true stereo), or to save in bitrate in case the augmented 3D object/information is not local but is received over a network. Received 3D information may also be a 3D reconstruction of a remote person, natural view, or parts of it. This may be the case for example in an immersive telepresence system bringing participants virtually into the same meeting space.

Systems and methods disclosed herein use a varifocal approach for the rendering of multiple focal planes, so that focal planes are time-multiplexed to form a complete scene. Although time-multiplexing tends to sacrifice some brightness in the rendering of the scenes, it simplifies the optical and mechanical structure, and on one part helps to achieve a more satisfactory form factor for the implementation.

Mechanical adjustment of lenses may be too slow for high frequency rendering of focal planes. Adequate speed for changing focal distances may be achieved using, for example, electronically controllable varifocal liquid crystal (LC) lenses.

One feature of some embodiments is the ability to support multiple focal plane renderings by multiplexing several optical arrangements within the same physical pipeline, an approach here referred to as structural multiplexing. In particular, no mechanical actuators or changes are needed, as a separate set of electronically controllable LC lenses is activated for each rendered focal plane. Structural multiplexing reduces the need to combine parallel optical structures and thus may reduce the size of the implementation.

Further, variations in the optical structure do not affect the positioning of major system components (displays, SLMs, mirror elements, optical combiners, etc.), which reduces the need for components, eases up the solution, and keeps the physical size of the implementation reasonable, despite supporting multiple occlusion-capable focal planes.

Occlusion capability is implemented in many display embodiments described herein. This avoids the transparency and color distortions that may otherwise be produced by an augmentation process without occlusion support.

An optical structure tends to cause an offset between real and effective eye-points. A small offset may be acceptable, but any variation during use is undesirable. In order to keep the effective eye-point fixed, the optical length of the implementation is preferably kept constant during vari-focal rendering of focal planes.

Some embodiments disclosed herein provide for no offset between real and virtual eye-points. Other embodiments trade off some eye-point accuracy for a better form factor of the implementation. Other variations relax the requirements of form factor by trading-off the occlusion capability.

FIG. 18B illustrates a display structure capable of displaying images at multiple focal planes in accordance with some embodiments.

In the system of FIG. 18B, an augmented reality (AR) tracking camera 1851 and a depth sensor 1852 provide input to an AR pose tracking module 1853. The camera 1851 may detect an AR marker or other feature that is associated with an augmentation in the AR content production stage. In some embodiments, the depth sensor 1852 and the camera 1851 may be combined into a single sensor, such as an RGBD camera. The depth sensor may be, for example, a structural light sensor or a time-of-flight sensor. An image plane formation module 1854 generates images to be displayed at different focal planes. The images may be based on received content 1849 and the user's pose as determined by the pose tracking module 1853. The image plane formation module 1854 further operates to determine which regions (e.g. which pixels) within an image plane should be fully or partially occluded. In some embodiments, 3D data to be augmented may need to be manipulated e.g. for foreground occlusions, color corrections, and transparent effects, e.g. shadows. The different image planes generated by the image plane formation module are provided to a multiplexer 1863, which provides the different image planes to the augmentation display component 1812 and occlusion mask 1810 at appropriate times in a synchronized manner with control of the optics.

In this example, inverting lenses 1806a, 1806b, 1806c and eyepiece lenses 1808a, 1808b, 1808c are adjustable lenses (e.g. liquid crystal lenses) that are controlled by respective control voltages received from a varifocal control module 1862. In this example, a control voltage switches the corresponding lens between a state in which the lens acts as a converging lens with a predetermined positive optical power and a state in which the lens has an optical power of zero (acting like a transparent sheet). It should be understood that in other embodiments, the optical power may be controllable between different non-zero optical powers or even negative optical powers, with the lens arrangements being adjusted accordingly.

The varifocal control module 1862 operates such that at any one time, a pair of lenses consisting of one inverting lens and one eyepiece lens is active. Three pairs are used in this example. A first pair is lenses 1806a and 1808a. A second pair is lenses 1806b and 1808b. A third pair is lenses 1806c and 1808c. In the state illustrated in FIG. 18B, lenses 1806b and 1808b are active. The focal plane visible to a user is determined by which lens pair is active. The varifocal control module 1862 reports to the multiplexer 1863 information (such as an index) indicating which focal plane is visible. In response, the multiplexer 1863 provides the appropriate image to the display component 1812 and the appropriate occlusion information to the occlusion mask 1810. The optical components within box 1865 are referred to herein as a structural multiplexer. The structural multiplexer 1865 multiplexes (overlays) several optical pipelines and produces renderings of occluded focal planes as described in greater detail below.

In example embodiments, in addition to the normal limitations by time multiplexing (e.g. reduced brightness), the number of focal planes may be limited by the overall attenuation of LC lenses. The typical 3-5 focal planes is thus a good target for occlusion-capable near-eye displays.

In some embodiments a head-mounted display system (e.g. glasses) captures feature data (e.g. a marker) with a camera mounted to the head-mounted display. The system detects and tracks the pose of the feature data (e.g. marker) from the user's viewpoint. The system receives, over a network, 3D data (e.g. video plus depth) for the virtual content to be augmented. For each eye, focal planes are formed corresponding to the virtual object to be augmented. Using the pose data, for each eye and each focal plane, the system forms an occluding mask for blocking the optical-see-through background view. For each focal plane, the system (1) selects the appropriate lens pair to be active, and the system controls the optical powers of the selected and deselected lenses accordingly, (2) blocks the optical-see-through view with the corresponding occluding mask by controlling pixel transparencies of the blocker element, (3) displays the corresponding focal plane data on the augmenting display, compensating for the loss of brightness as needed, and (4) forms the augmented view by combining the displayed augmentation with the occluded optical-see-through view.

In the step of capturing the environment for marker(s) or features, a camera embedded to the glasses structure captures video from the user's surroundings. In a subsequent step, the video data is searched for a set of distinctive features, a marker or a point-cloud, as part of the captured view. When producing the AR content, the chosen marker or feature set (its origin and pose) is associated with a desired augmentation.

In the step of detection and tracking of features, the captured video is searched for distinctive features, for example a marker or a point-cloud, in various orientations and scales. Previous tracking results are typically used to reduce the computational load for the search (avoiding the need to do an exhaustive search). The detection and tracking of features (e.g. a marker) uses known techniques for augmented reality. Marker tracking is a traditional approach in AR, and is well supported by existing technologies. Tracking natural features may be favored for being less disturbing than visible markers. In both approaches, sets of captured features are used to define the viewpoint and real-world coordinates for positioning virtual information or objects. Detection and tracking may be assisted by electronic means in the glasses (IMU sensor or the like), and/or by data communicated between external tracking module and the glasses. The coordinates and scale of a tracked marker or other set of features are used for positioning and scaling of virtual objects, decomposed into focal planes, as well as for generating occlusion masks for blocking the incoming (OST) view and replacing it by corresponding focal planes.

In the step of receiving data to be augmented, 3D data to be augmented may be obtained over a local and/or external network to the glasses. The data may be, for example, in depth plus texture format, having an in-advance chosen position, scale, and orientation with respect to a feature set (a marker or a point cloud) potentially somewhere in user's environment. Performing the augmentation may be conditional on the existence/detection of the feature set in the environment.

In the step of forming focal planes for the object to be augmented, the 3D object is decomposed into focal planes using the knowledge of the distance and shape of the 3D object. This step is performed based on information regarding the user's position with respect to the known set of features (a marker or a point cloud), and thus the position (distance), orientation and scale for the object to be augmented. This decomposition can use any one of a variety of techniques of MFP formation, such as those described above. Virtual viewpoint generation may be chosen to generate stereopsis, and thus save in bitrate when receiving augmented 3D objects/information over a network.

In the step of forming occluding masks, occluding masks are generated for each focal plane to block chosen pixels/areas of the real-world view before adding the augmented object (decomposed into corresponding focal planes). The formation of occluding masks may be performed based on information regarding a users position with respect to the known set of features (a marker or a point cloud) and the pose and scale of the augmented object. Occluding masks may be planar (binary) silhouettes of the augmented 3D object at corresponding distances/depths, indicating whether the pixels are, or are not, replaced by the corresponding pixels of the augmented object. More generally, the occlusion mask is a spatial mask for specifying more general image processing operations. Correspondingly, the occlusion mask values may have any weight between 0 and 1, enabling summing up the real-world view and augmented information in any ratio instead of just replacing the real-world view. This is beneficial for example for making occlusion leak compensation or color corrections when not actually supporting occlusions. Continuous weight values may also be used for adding virtual shadows.

Structural multiplexing is performed by activating and deactivating lens pairs as required. Structural multiplexing is implemented using a varifocal approach, which sequentially time-multiplexes optical components inside a shared structure, so that a desired number of focal planes are rendered at chosen distances. In example embodiments, optical components doing this rendering are electronically controllable pairs of lenses, on both sides of the optically combined (e.g. using a half-silvered mirror) blocker and augmentation elements.

For each focal plane (e.g. each focal plane $FP_i$, for i=1 to N), a step of occluding the real-world view may be performed. At this step, the occlusion mask generated in Step 5 is used for occluding parts of the real-world view. Occluding may be accomplished for example by using a transmissive (LC) blocker or a reflective (SLM) blocker. The reflective option may result with a more crisp and high contrast result, when used with a polarized optical combiner, although use of a reflective blocker would call for an appropriate rearrangement of the mechanical and/or optical structure of the display. The blocker and the augmentation display are preferably at substantially the same virtual distance from a viewers eye-point.

For each focal plane, a step of displaying augmented data is performed. In this step, virtual 3D information decomposed into focal planes is displayed in synchronization with respective occlusion patterns. A 2D display element is used for showing the augmented object/information sequentially, one focal plane at a time. When forming the focal planes, user position and (in AR content production) chosen object pose and size were used to get focal planes from desired distances. At any moment, the displayed focal plane data is in synchronization with the occlusion mask data for the corresponding distance. The form of the optical pipeline is obtained using a varying number of reflective elements (mirrors and/or prisms). Depending on the number of reflections, the orientation of the displayed images and occluding masks may need to be flipped/erected in order to see the augmentation in correct orientation. Similarly, some scaling of the contents may be employed in order to get occlusions and augmentations rendered in the correct size.

For each focal plane, a step of combining and showing occluded background with augmented data is performed. An optical combiner is used to combine the occluded real-time view aligned with the corresponding augmented focal plane. The optical combiner may be a half-silvered mirror. The combiner may be oriented at a 45° angle to both the occluding and augmenting display elements. The combiner may have a polarizing effect to increase image quality by increasing separation between transmitted and reflected image components). Other optical components (mirrors and lenses) of the system may be used to deliver the combined result to a users eyes. Example choices based on thin lens approximation are shown in the description, although other components may be chosen to optimize quality, e.g. to reduce chromatic and other aberration and to adapt the form factor. Other components include freeform/wedge shaped waveguides for a more compact replacement of eyepiece/near-eye mirrors and lenses.

After all focal planes (e.g. all N focal planes) have been processed and displayed, the procedure is repeated, cycling through the focal planes. The cycling through the focal planes may be performed at a sufficiently high rate such that the cycling is not visible to the user so as to avoid a flicker effect. In order to have a fluent perception of the augmented information (possibly animated), without flicker, the framerate for the augmentation is preferably on the order of at least 30 Hz. With N time-multiplexed focal planes, the rendering frequency is preferably on the order of at least N·30 Hz in order to avoid flickering of individual focal planes, each of which is lit only $1/N^{th}$ of the time.

The display system may be calibrated before use. One mechanical calibration is to adjust the inter-pupillary distance (IPD) to meet with each users individual needs. Additional calibration steps, relating both the mechanical and electronic implementation, include: tracking camera calibration for compensating geometric distortions; depth sensor calibration (if in use) for correct depth sensing results; spatial alignment between occlusion masks (blocker), augmented objects, and the real-world view; control voltages (optical powers) for LC lenses; calibrating (minimizing) the lag between virtual and real-world views. Various techniques, both manual and automated, can be used to assist calibration.

Content dependent calibration methods may be relevant during system operation. Such methods may include color calibration in OST implementations without occlusion capability and occlusion leak calibration/compensation in (non-ideal) direct occlusion control approaches.

Disclosed embodiments support rendering of multiple focal planes, thus reducing vergence-accommodation conflict (VAC) preventing natural focusing on 3D content. Structural multiplexing enables the use of the same optical pipeline for rendering of several focal planes. This avoids the need to implement (replicate) and combine parallel optical structures. Example embodiments support multiple focal plane renderings by multiplexing several optical arrangements within the same physical pipeline (structural multiplexing). In particular, no mechanical actuators and changes are needed due to configuring the optical system in time-multiplexed way by LC lenses.

In example embodiments, the optical pipeline is essentially symmetrical to keep the scale unchanged (i.e. to provide a magnification of 1:1). The symmetry may however double the optical pipeline length compared to a non-occluding version and may increase the produced viewpoint/eye offset.

In some embodiments, at any one time, one LC lens pair (focal distance) out of all LC lens pairs is set as active, and other lenses are inactivated, i.e. set in transparent mode without optical power or effect. No mechanical actuators or changes are needed in such embodiments to select or change the lens positions.

Structural Multiplexing.

Example display systems disclosed herein support multiple focal plane renderings by multiplexing several optical arrangements within the same physical pipeline, a technique referred to here as structural multiplexing. Switching between each optical structure is performed electronically by disabling and enabling lens pairs in turn to select the desired focal distance of each focal plane. No mechanical actuators and changes are used to change the lens positions.

Using the basic structure in FIG. 18B, when selecting a pair of lenses for changing the rendering distance, the positions of the blocker element (SLM), the augmentation display, and the optical combiner can be kept fixed. This is possible by adjusting the length of the collimated sections around these two lenses.

FIGS. 19A-19C provide a schematic illustration for supporting three focal planes by three pairs of varifocal LC lenses. Three options for focal plane renderings (focal distances) are shown keeping the length of the optical arrangement constant. In FIGS. 19A-19C, the three optical pipelines are shown as separate, but in real, by using structural multiplexing, all optical structures are overlaid in the same physical section. In FIGS. 19A-19C, active lenses are illustrated with solid lines, while inactive lenses are illustrated with dashed lines. FIG. 19A illustrates a configuration in which the active inverting lens and eyepiece lens are farthest from the users eye. The configuration of FIG. 19A is useful for generating a focal plane that appears to be relatively near to the user. FIG. 19B illustrates a configuration in which the active inverting lens and eyepiece lens are at an intermediate distance from the user's eye. The configuration of FIG. 19B is useful for generating a focal plane at an intermediate distance from the user. FIG. 19C illustrates a configuration in which the active inverting lens and eyepiece lens are at the least distance from the users eye. The configuration of FIG. 19C is useful for generating a focal plane at a greater distance from the user. Note that in the example of FIGS. 19A-19C, the positions of the blocker (1810), combiner (1814) and display component (1812) remain unchanged.

Structural multiplexing is performed by electronically controlling (activating and inactivating) varifocal LC lenses for each focal plane. Optical structures are overlapping in physical space, such that multiplexing does not necessarily increase the size of the display device.

Note that the above lens powers (and corresponding three focal plane distances) are just for examples, and are not chosen to optimize the result with respect to the human visual system. By using these examples values may be chosen for any feasible number of focal planes.

Focal Plane Distance and Eye-Point Offset.

As shown in FIGS. 19A-19C, the positions of the blocker element (for the background occlusions) and the augmentation display are kept fixed, while electronically switching a pair of lenses to different physical position. No mechanical movements are needed, as the lenses are either activated or inactivated in their pre-set positions. The position for the active lens pair is varied so that both the occlusions of the real-view and the augmented information are rendered at desired distances. Note that the occlusion mask and AR object size may also be adjusted to get a desired size for the augmentation.

Figure 20:
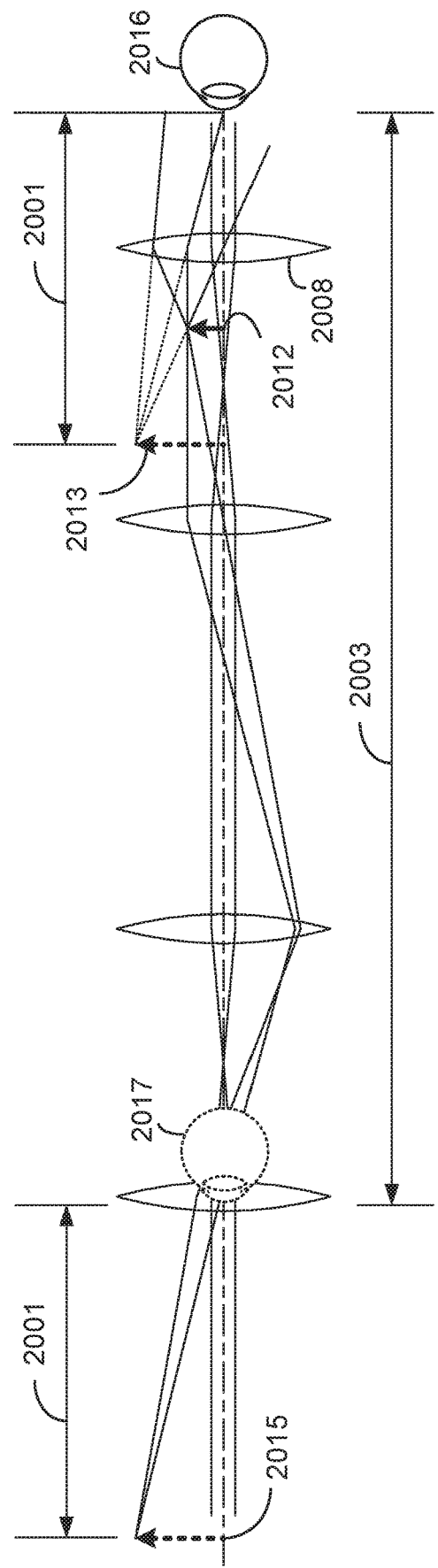
FIG. 20 is a schematic cross-sectional view of optics of an optical see-through display according to some embodiments, illustrating perceived eye point offset.

FIG. 20 illustrates the rendering distance with a display and blocker position in a system with equal lens powers and a chosen distance of the inverting lens pair (on the left). Note that changing the distance of the inverting lens pair (within certain limits) does not affect to the perceived distance of the MFP plane (object image).

For simplicity of illustration, the optical configuration of FIG. 20 is illustrated without the blocking layer, the combiner, or the display component; instead, the display component is illustrated at position 2012, namely the position of the reflected image of the display in the combiner. A displayed object is indicated by an upright arrow at 2012. The eyepiece lens 2008 forms a virtual image 2013 of the displayed object at position 2012. The distance 2001 between the users eye 2016 and the virtual image 2013 of the displayed object is the distance of the active focal plane ("MFP distance"). However, the virtual image 2013 has a position that corresponds also to position 2015 in real space, in that a real object at position 2015 would appear to the users eye to be in the same position as the virtual image 2013. A user is thus given the illusion of viewing the real world not from the true position 2016 of his eye, but rather from a perceived eye-point 2017. The disparity between the real eye position and the perceived eye-point is referred to as the eye-offset distance 2003. Note that an image displayed at position 2012 forms equal sized images both at positions 2013 and 2015, indicating 1:1 magnification of the system. Further, if the light from a real object at position 2015 is blocked by a blocker (multiplexed to the same position as display 2012), the reflected image on display 2012 occludes the real object in a correct way. The above thus describes how the system is used for implementing optical see-through AR glasses.

Reduction of Eye-Offset Distance.

Reflective elements such as mirrors and/or prisms may be used to reduce the eye-offset by folding the optical pipeline for AR/VR glasses. A prism is may be used as the objective component to mirror the incoming light to the optics sideways from the viewing line.

In addition to reducing the eye-offset, a better form factor may be achieved for the glasses by using mirrors. Light mirrors of high quality are also easy to fabricate.

In some embodiments, several mirror elements are used for reduction of eye-offset and/or improving device form factor. In addition, a half-silvered mirror element may be used as an optical combiner for the background blocked real-world view, and a focal plane of the (decomposed) virtual object to be augmented. This mirror element may also be polarizing, which may result with a sharper combined image. Instead of a transmissive blocker, a reflecting SLM may be used for blocking in some embodiments with appropriate rearrangement of the optical path.

Figure 21:
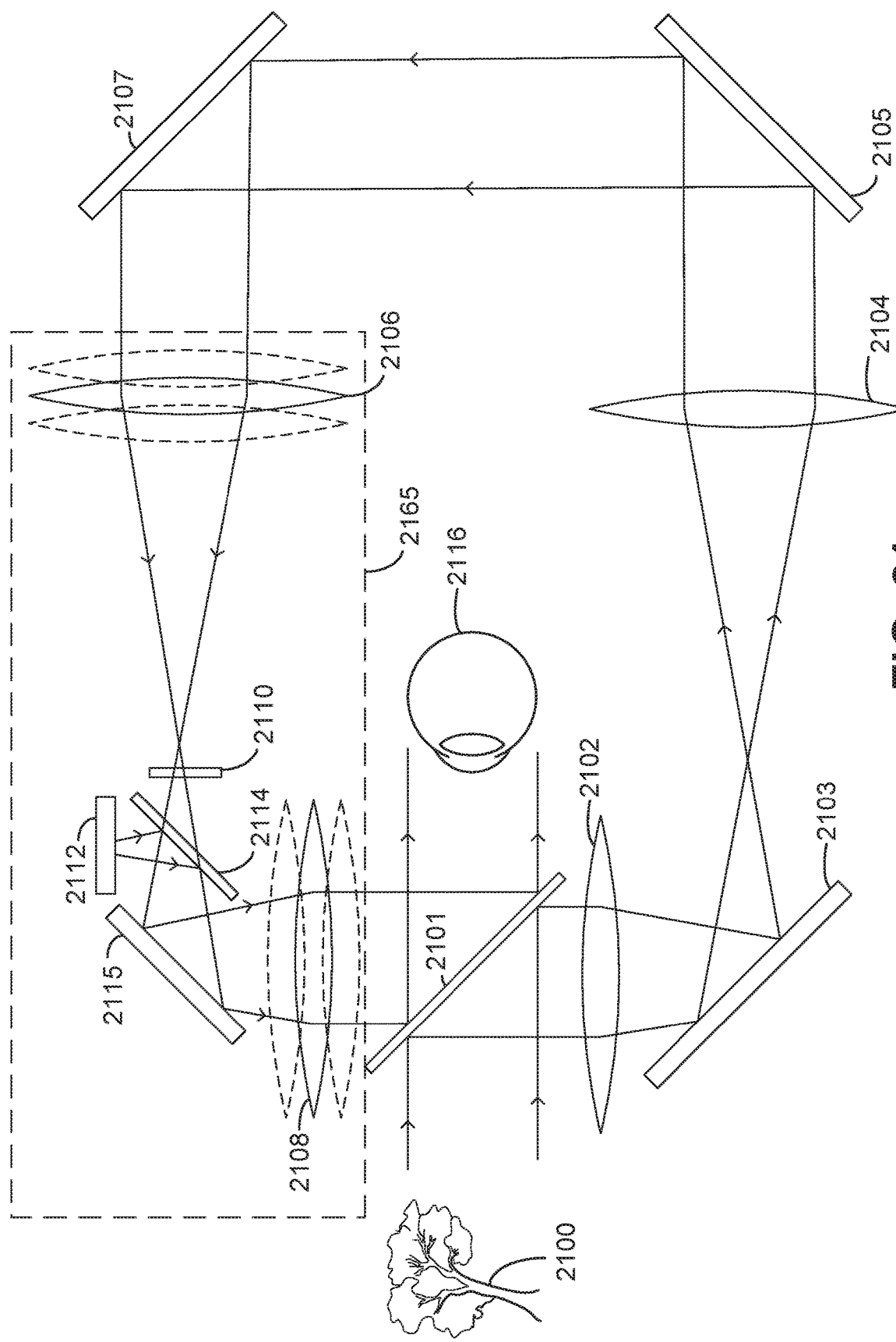
FIG. 21 is a schematic cross-sectional view of optics of an optical see-through display according to some embodiments, illustrating reduced or zero eye point offset.

FIG. 21 illustrates an embodiment of a display device with near-zero eye-point offset. Light from a real-world scene 2100 is reflected by a two-sided mirror 2101 toward an objective lens 2102. From the objective lens, the light traverses, in sequence, mirror 2103, first inverting lens 2104, and mirror 2105 before entering structural multiplexer 2165. The structural multiplexer includes controllable lenses. In the configuration shown in FIG. 21, inactive lenses are shown in dashed lines and active lenses are shown in solid line. Within the structural multiplexer 2165, the light traverses second inverting lens 2106, blocking layer 2110, and combiner 2114. At the combiner 2114, light from the real-world scene is combined with light from a display component 2112. The combined light is reflected by mirror 2115 and travels through active eyepiece lens 2108 before being reflected by the two-sided mirror 2101 into the users eye 2116.

Optically, the structure of FIG. 21 is similar to that of FIG. 18B except, in order to avoid any eye-offset between real and virtual/effective eye-point, the virtual eye-point is looped back to the real eye-point. This is performed using four one-sided mirrors and one two-sided mirror in front of the user's eye and a combiner for combining an augmentation with a correspondingly blocked real view. The collimated sections are used to get space for the focal distance options implemented by the pairs of electronic lenses. In addition, four reflectors are used to get the looped-back (zero-offset) shape for the system. The incoming view is reflected several times by the mirrors, so that the net effect is that the view is upright and the optical pipeline is equivalent to the simplified unfolded version in FIG. 18B.

Implementations Omitting Background Occlusions.

Figure 22:
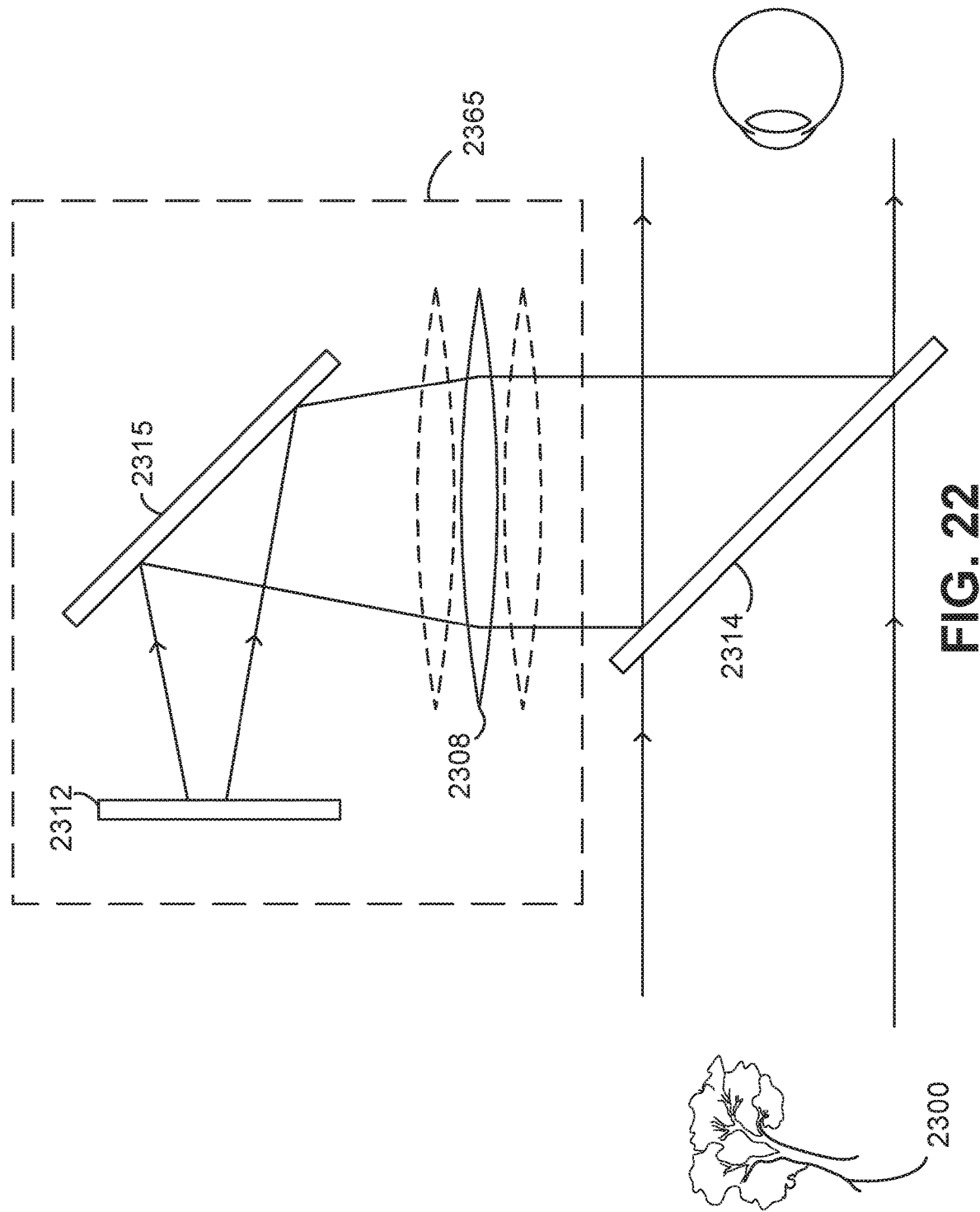
FIG. 22 is a schematic cross-sectional view of optics of an optical see-through display according to some embodiments.

Further embodiments, such as the embodiment illustrated in FIG. 22, does not include componentry for occluding the real-world view. Such embodiments can be implemented with fewer components. The reduced number of components improve the transparency of the system, potentially allowing for more focal planes.

In the embodiment of FIG. 22, light from an external scene 2300 passes directly through a combiner 2314 to the user's eye. Light from a display component 2312 is reflected by a mirror 2315 through an active eyepiece lens 2308. A combiner 2314 combines light from the eternal scene with light from the display to present to the user's eye. In some embodiments, the reflector 2315 inside the structural multiplexing unit 2365 is not used, with light being provided directly from the display component 2312 to the eyepiece lens.

A display method using an embodiment without occlusion, such as the embodiment of FIG. 22, may be implemented as described above, with steps involving occlusion being omitted as appropriate.

The embodiment of FIG. 22 provides for zero eye-offset with the tradeoff of omitting background occlusion.

Implementations Using Direct Occlusion.

Figure 23:
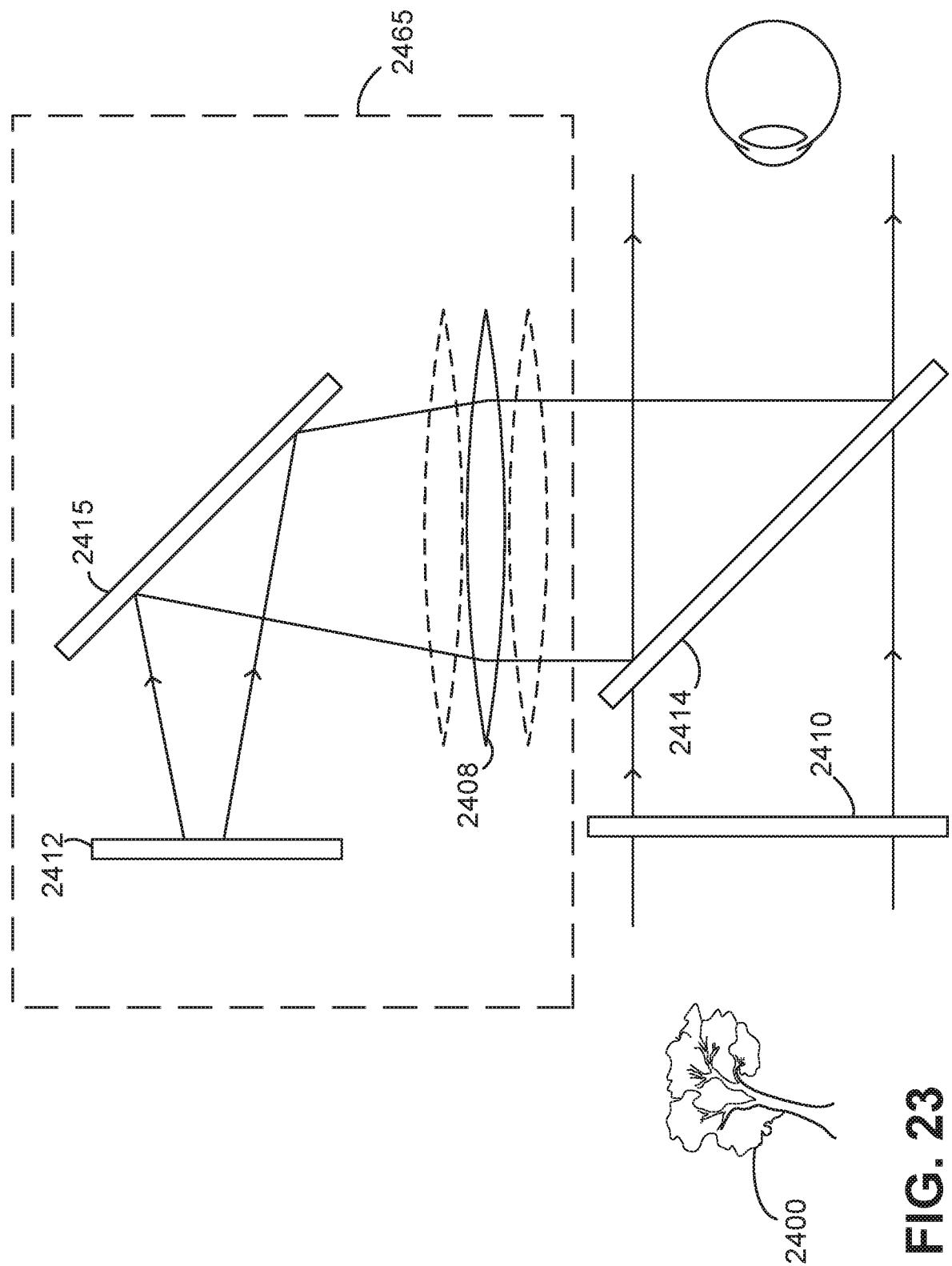
FIG. 23 is a schematic cross-sectional view of optics of an optical see-through display according to some embodiments.

In some embodiments, a non-optimal direct occlusion is performed to the real-world view by a SLM element in front of the eyepiece. One such embodiment is illustrated in FIG. 23. In the embodiment of FIG. 23, light from an external scene 2400 passes through a blocking layer 2410 (e.g. a spatial light modulator) before traveling through a combiner 2414 to the user's eye. Light from a display component 2412 is reflected by a mirror 2415 through an active eyepiece lens 2408. A combiner 2414 combines light from the eternal scene with light from the display to present to the user's eye. In some embodiments, the reflector 2415 inside the structural multiplexing unit 2465 is not used, with light being provided directly from the display component 2412 to the eyepiece lens.

An AR tracking camera (or a separate camera dedicated for the purpose) of the system is used to capture the real-world view, which may then be compensated for occlusion leaks around the (non-optimally) used occlusion mask. The compensation information is added to the augmentation before displaying it on the augmentation display. After the compensation, the augmentation thus contains the virtual information or object and a modified fraction of the real-world view to compensate for the occlusion leak caused by using a direct occlusion mask (possibly at a non-optimal distance).

In embodiments using direct occlusion, occlusion leak may be compensated by increasing the luminance of portions of the focal plane images that correspond to the leak area. Due to the position of the blocking layer, the blocker diffuses the areas outside the masks by the amount depending on its distance to the focal plane to be occluded. The amount and extent of diffusion depends on the human visual system and eye-parameters (ideally measured from viewer's eyes), and may to be modelled in order to modify/compensate the view. The modifications are most feasibly done to the information to be augmented, which is anyway to be added to the optical see-through view. Using a human-visual-system-based model for the occlusion leak (changes in the luminance outside masked areas), a compensation is calculated to be added to the real-view. In practice, the compensation can be added to the information to be augmented (e.g. added to the see-through view in the optical combiner).

Additional Discussion.

Display systems and methods described herein allow for display of multiple focal planes and allow for occlusion in different focal planes even in embodiments that have only a single display and single blocker (per eye). Because it is not necessary for light to traverse multiple displays and multiple blockers, transparency can be improved, and interferences and other possible stray effects between stacked components can be avoided.

Note that various hardware elements of one or more of the described embodiments are referred to as "modules" that carry out (i.e., perform, execute, and the like) various functions that are described herein in connection with the respective modules. As used herein, a module includes hardware (e.g., one or more processors, one or more microprocessors, one or more microcontrollers, one or more microchips, one or more application-specific integrated circuits (ASICs), one or more field programmable gate arrays (FPGAs), one or more memory devices) deemed suitable by those of skill in the relevant art for a given implementation. Each described module may also include instructions executable for carrying out the one or more functions described as being carried out by the respective module, and it is noted that those instructions could take the form of or include hardware (i.e., hardwired) instructions, firmware instructions, software instructions, and/or the like, and may be stored in any suitable non-transitory computer-readable medium or media, such as commonly referred to as RAM, ROM, etc.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method of displaying video frames having corresponding depth information, the method comprising:
    mapping a first image frame to a first set of at least two image planes;
    mapping a subsequent second image frame to a second set of at least two image planes, wherein each image plane in the first and second set has a specified depth, wherein the first and second set differ in at least one depth, and wherein at least one depth of an image plane in the second set is between two consecutive depths of image planes in the first set;
    displaying each of the image planes in the first set at the respective depth thereof;
    after displaying all of the image planes in the first set, displaying each of the image planes in the second set at the respective depth thereof.

2. The method of claim 1, wherein mapping the first image frame to the first set of image planes is performed using a first set of blending functions, and mapping the second image frame to the second set of image planes is performed using a second set of blending functions.

3. The method of claim 1, wherein at least one of the blending functions has the form 0.5+0.5 cos(Ax+B) for at least a selected portion of a domain thereof.

4. The method of claim 3, wherein the at least one blending function has a value of zero or one outside the selected portion.

5. The method of claim 1, wherein all of the image planes in the first set are displayed simultaneously and, subsequently, all of the image planes in the second set are displayed simultaneously.

6. The method of claim 1, wherein no two image planes are displayed simultaneously.

7. The method of claim 1, wherein all depths of image planes in the second set are different from all depths of image planes in the first set.

8. The method of claim 1, wherein display of the image planes in the first set and display of image planes in the second set are performed cyclically.

9. The method of claim 8, wherein cyclic display of the image planes in the first set and display of image planes in the second set is performed a rate of at least 30 Hz.

10. The method of claim 9, wherein displaying an image plane at a respective depth thereof includes:
    displaying an image on a display component; and
    adjusting optics of a display device to form a virtual image of the display component at the respective depth.

11. The method of claim 1, wherein the image is displayed on a display device comprising a display component and a plurality of electronically controllable eyepiece lenses at different positions along an optical path from the display component, and wherein displaying an image plane at a respective depth thereof includes:

displaying an image on the display component; and controlling the eyepiece lenses so as to form a virtual image of the display component at the respective depth.

12. The method of claim 11, wherein controlling the eyepiece lenses comprises controlling a selected one of the eyepiece lenses to have a predetermined positive optical power and controlling the remaining eyepiece lenses to have substantially zero optical power.

13. The method of claim 12, wherein the display device is an optical-see-through display comprising an objective lens and at least one inverting lens system.

14. A display device for displaying video frames having corresponding depth information, the device comprising:

an image plane formation module operative to map a first image frame to a first set of at least two image planes and to map a subsequent second image frame to a second set of at least two image planes, wherein each image plane in the first and second set has a specified depth, wherein the first and second set differ in at least one depth, and wherein at least one depth of an image plane in the second set is between two consecutive depths of image planes in the first set;

display optics operative to display image planes at respective associated depths; and a multiplexer operative to cause the display optics to (i) display each of the image planes in the first set at the respective depth thereof and (ii) after displaying all of the image planes in the first set, display each of the image planes in the second set at the respective depth thereof.

15. The display device of claim 14, wherein the multiplexer is configured to display all of the image planes in the first set simultaneously and, subsequently, to display all of the image planes in the second set simultaneously.

16. The device of claim 14, wherein the display optics comprises a display component and a plurality of electronically controllable eyepiece lenses at different positions along an optical path from the display component, and wherein the displaying of the image planes comprises:

displaying an image on the display component; and controlling the eyepiece lenses so as to form a virtual image of the display component at the respective depth.

17. The device of claim 16, wherein at least one of the electronically controllable eyepiece lenses is switchable between a state with a positive optical power and a state with substantially zero optical power.

18. The device of claim 14, wherein the display optics comprise an optical-see-through display having an objective lens and at least one inverting lens system.

19. An apparatus comprising a processor configured to perform at least:

mapping a first image frame of a video to a first set of at least two image planes;

mapping a subsequent second image frame of the video to a second set of at least two image planes, wherein each image plane in the first and second set has a specified depth, wherein the first and second set differ in at least one depth, and wherein at least one depth of an image plane in the second set is between two consecutive depths of image planes in the first set;

displaying each of the image planes in the first set at the respective depth thereof;

after displaying all of the image planes in the first set, displaying each of the image planes in the second set at the respective depth thereof.

* * * * *